United States Patent
Herrmann-Nowosielski et al.

(10) Patent No.: US 12,403,424 B2
(45) Date of Patent: Sep. 2, 2025

(54) CARBON DIOXIDE REMOVAL AND ASSOCIATED SYSTEMS, DEVICES, AND METHODS

(71) Applicant: Sponge DAC, Inc., Cambridge, MA (US)

(72) Inventors: Marek Herrmann-Nowosielski, Cambridge, MA (US); Alexander Nowosielski-Slepowron, Cambridge, MA (US)

(73) Assignee: Sponge DAC, Inc., Cambridge, MA (US)

( * ) Notice: Subject to any disclaimer, the term of this patent is extended or adjusted under 35 U.S.C. 154(b) by 0 days.

(21) Appl. No.: 19/033,424

(22) Filed: Jan. 21, 2025

(65) Prior Publication Data

US 2025/0235821 A1    Jul. 24, 2025

Related U.S. Application Data

(60) Provisional application No. 63/623,775, filed on Jan. 22, 2024.

(51) Int. Cl.
*B01D 53/83* (2006.01)
*B01D 53/34* (2006.01)
(Continued)

(52) U.S. Cl.
CPC ......... *B01D 53/83* (2013.01); *B01D 53/346* (2013.01); *B01D 53/62* (2013.01); *B01D 53/96* (2013.01); *B01D 2253/20* (2013.01); *B01D 2257/504* (2013.01); *B01D 2258/06* (2013.01); *B01D 2259/40094* (2013.01); *B01D 2259/40096* (2013.01); *B01D 2259/40098* (2013.01)

(58) Field of Classification Search
None
See application file for complete search history.

(56) References Cited

U.S. PATENT DOCUMENTS

| | | |
|---|---|---|
| 8,500,859 B2 | 8/2013 | Eisenberger |
| 11,577,222 B2 | 2/2023 | Younes et al. |
| | (Continued) | |

FOREIGN PATENT DOCUMENTS

CN    106163636    11/2016

OTHER PUBLICATIONS

International Search Report and Written Opinion for International Patent Applicaton No. PCT/US2025/012476, Applicant: Sponge DAC, Inc., mailed Apr. 29, 2025, 12 pages.

*Primary Examiner* — Jelitza M Perez
(74) *Attorney, Agent, or Firm* — Perkins Coie LLP

(57) ABSTRACT

Methods and systems for carbon dioxide removal are disclosed herein. In some embodiments, a representative carbon dioxide removal apparatus includes a web with a sorbent configured to absorb carbon dioxide and a drive system operably coupled to the web. The drive system can transport the web from a first zone, in which the web is exposed to gas, to a second zone, where the first zone is at a first temperature and the second zone is at a second temperature greater than the first temperature. The apparatus can further include a heating mechanism configured to increase a temperature of the second zone at least to the second temperature. This causes the removal of fluid including carbon dioxide from the web within the second zone.

18 Claims, 12 Drawing Sheets

(51) Int. Cl.
   *B01D 53/62* (2006.01)
   *B01D 53/96* (2006.01)

(56) References Cited

U.S. PATENT DOCUMENTS

| | | |
|---|---|---|
| 2014/0174292 A1 | 6/2014 | Kwon et al. |
| 2015/0273385 A1* | 10/2015 | Eisenberger ........... B01D 53/08 95/107 |
| 2022/0212141 A1* | 7/2022 | Younes .................. B01D 53/06 |
| 2022/0355238 A1* | 11/2022 | Lackner ............. B01D 53/0407 |

* cited by examiner

1200

1202
Provide a web comprising a sorbent configured to absorb carbon dioxide, wherein the sorbent comprises an amine group and/or a molecular weight of less than 1,000 atomic mass units (AMUs)

1204
Transport the web via a drive mechanism from (i) a first zone to (ii) a second zone within an at least partially enclosed area

1206
Heat a portion of the web within the second zone to a predetermined minimum temperature, such that an affinity of the web to absorb carbon dioxide decreases

1208
Remove fluid comprising carbon dioxide from the second zone

*FIG. 12*

CARBON DIOXIDE REMOVAL AND ASSOCIATED SYSTEMS, DEVICES, AND METHODS

CROSS-REFERENCE TO RELATED APPLICATION(S)

The present application claims the benefit of and priority to U.S. Provisional Patent Application No. 63/623,775, filed Jan. 22, 2024, the disclosure of which is incorporated herein by reference in its entirety.

TECHNICAL FIELD

This present disclosure relates to the removal of carbon dioxide gas and associated systems, devices, and methods.

BACKGROUND

Carbon capture is an emerging industrial carbon dioxide removal process that can be used to reduce atmospheric carbon dioxide levels. Carbon capture is a process that involves capturing carbon dioxide gas-whether directly from the air or from any other location-using various technologies, including but not limited to direct air capture (DAC) systems. Once captured, the carbon dioxide can then be permanently stored deep underground, or it can be converted for utilization. Carbon capture has a critical role in helping to address legacy emissions worldwide and is a key approach needed to achieve a net-zero emissions future.

BRIEF DESCRIPTION OF THE DRAWINGS

Features, aspects, and advantages of the presently disclosed technology can be better understood with regard to the following drawings.

FIG. 12 is a block flow diagram of a method for removal of carbon dioxide gas, in accordance with embodiments of the present technology.

Figure 1:
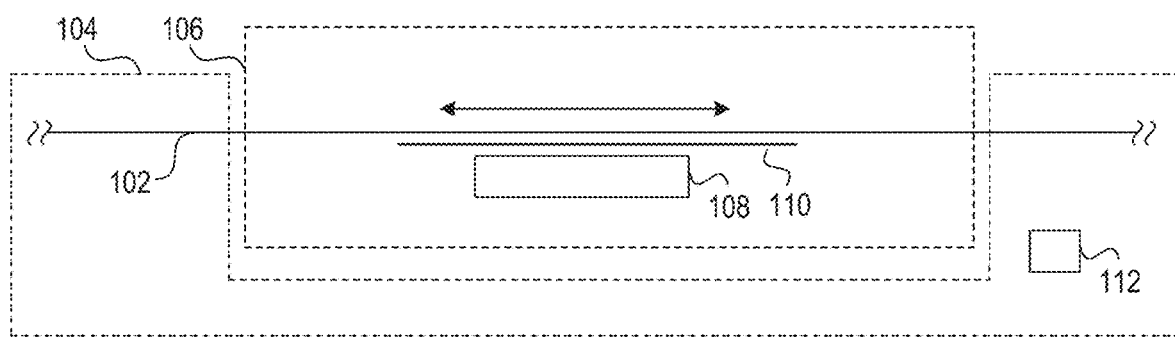
FIG. 1 is a schematic block diagram of a system for removal of carbon dioxide gas, in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

The level of carbon dioxide in the atmosphere is increasing, and emissions of greenhouse gases, including carbon dioxide, may be at least partially responsible for rising global temperatures. This warming could result in increased heat waves, longer warm seasons, and shorter cold seasons. Even if carbon dioxide emissions are eliminated or dramatically reduced, carbon dioxide removal may still be necessary to limit global warming. For example, carbon dioxide removal can be needed to compensate for carbon dioxide emissions from hard-to-abate emissions sources, emissions for which abatement would be socially unjust, and to remove historical emissions.

Carbon capture enables extraction of carbon dioxide gas, and carbon capture systems can employ chemical sorbents or physical processes to do so. While carbon capture technologies have shown promise in reducing atmospheric carbon dioxide levels, conventional carbon capture systems and methods have a number of challenges. For example, carbon capture systems typically require significant energy input to operate the capture process, which can affect the overall efficiency and cost-effectiveness of the technology. Moreover, significant water is often required for conventional systems, which rely primarily on applying direct steam in order to heat sorbents. These challenges can undercut the environmental benefits of carbon capture systems.

Embodiments of the present disclosure can extract carbon dioxide gas while also addressing many of the above-noted deficiencies. Such embodiments can include a web that directly contacts the gas and utilizes a sorbent material to capture at least some of the carbon dioxide present. The web can be transported between a first zone in which the web is directly exposed to gaseous conditions to a second zone in which the web is exposed to a temperature above the temperature of the original gaseous conditions, thereby causing the web to desorb the carbon dioxide within the second zone. In doing so, embodiments of the present disclosure are able to produce a concentrated carbon dioxide gas that can then be removed from the second zone and then stored or utilized.

Embodiments of the present disclosure also enable carbon dioxide removal with lower energy and water consumption than conventional systems. For example, the present disclosure describes systems for carbon dioxide removal that do not require applying steam directly to the web and/or wetting the web, as significant heat and/or energy is needed to remove the water from the web.

Additionally, the present disclosure describes methods of recapturing heat used throughout the process so that the heat can be reused, thereby decreasing the energy needed to run the carbon dioxide removal process. These and other improvements over conventional systems reduce the energy and water required to run the carbon dioxide removal process.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Carbon Capture System

Figure 2:
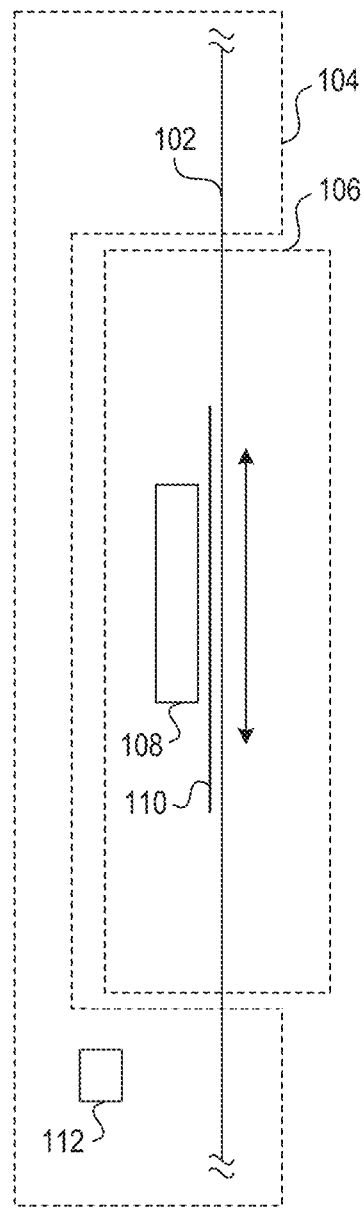
FIG. 2 is a rotated schematic block diagram of a system for removal of carbon dioxide gas, in accordance with embodiments of the present technology.

FIG. 1 is a schematic block diagram of system 100 for removal of carbon dioxide gas, and FIG. 2 is a schematic block diagram of the system 100 shown in FIG. 1 rotated approximately 90 degrees. As shown by FIGS. 1 and 2, the system 100 for carbon capture can be configured in any orientation with respect to gravity, such that a web of the system 100 can be normal or parallel to the direction of gravity. Referring to FIGS. 1 and 2 together, the system 100 includes a web 102 extending between a first zone 104 and a second zone 106, and a heating mechanism 108 positioned to heat the web 102 and that is within the second zone 106. The system 100 can further include a conductor 110 which can be located between the heating mechanism 108 and the web 102. In some embodiments, the conductor 110 contacts the web 102. The system 100 can further include a controller 112.

The web 102 can be thin, flexible, and continuous in nature. For example, a range of thicknesses for the web can be used. In some embodiments, the web is less than 0.1 mm, 0.5 mm, 0.75 mm, 3 mm, 10 mm, or within a range of 0.1-10 mm or an increment therebetween (e.g., 5 mm). In some embodiments, the web is a flexible substrate and the flexibility is measured as bending stiffness. The bending stiffness can be, for example, 0.1 mNm (millinewton-meter), 500 mNm, or within a range of 0.1-500 mNm or an increment therebetween (e.g., 50 mNm).

In some embodiments, the web is made of a single material or a combination of materials. The material can include cellulose fibers (e.g., lignin, cotton, denim, and/or canvas), cellulose, jute, flax, abaca, pina, ramie, bagasse, banana, wood, silk, wool, amphibole, wollasatone, palygorskite, nylon, rayon, Modal, diacetate, triacetate, carbon, polyester, polyethylene terephthalate (PET), polybutylene terephthalate (PBT), phenol-formaldehyde (PF), polyvinyl chloride (PVC), polypropylene (PP), polyethylene (PE), polyacrylonitrile (PAN), Twaron, Kevlar, Nomex, high modulus polyethylene (HMPE), elastomers, urethane, Spandex, polyurethane, and/or elastolefin. In some embodiments, the web 102 is made up of a fabric, which is a material that has been woven or non-woven (knitted, tufted, knotted, or bound together). The components of a fabric can be natural or synthetic fibers, threads, yarns, or similar materials.

The web can have a length that depends upon the scale of the system 100. In some embodiments, the web has a length of at least 5 meters, 10 meters, 15 meters, 20 meters, 25 meters, or 30 meters, or within a range of 5-30 meters or an increment therebetween (e.g., 18 meters). In some embodiments, the length is no more than 30 meters in length. Additionally or alternatively, only a portion of the length of the web is within the second zone 106 at a given point in time. As an illustrative example, the length of the web that can be within the second zone at a given point in time is no more than 10%, 15%, 20% or 25% or within a range of 10-25% (or an increment therebetween).

The web 102 can include a sorbent, which can be a substance used to adsorb liquids or gases. In the context of gas absorption, the sorbent can be a material that can capture and hold gas molecules, such as carbon dioxide, through physical or chemical interactions. The sorbent can additionally absorb other gases or liquids, such as water. The sorbent can be integrated into the web 102 in such a way that it maximizes the surface area available for interaction with carbon dioxide, thereby enhancing the efficiency of the absorption process. The choice of sorbent material can depend on various factors, including its capacity to capture carbon dioxide, its stability under operating conditions, and its compatibility with the web 102. Additionally, the sorbent can be designed to facilitate easy regeneration or replacement, ensuring long-term functionality. The web 102 can have a very high mass ratio of sorbent to support. For example, the mass ratio of sorbent to support can be up to 1:1. This results in lower sensible heating requirements for each of the cycles of adsorbing and desorbing. This can also result in a lower specific energy requirement.

The sorbent can be an amino acid, lysine, glycine, taurine, alkali earth metal salt, amine group, and/or amine. In some embodiments, the sorbent can be a proteinogenic or non-proteinogenic amino acid, not an amino acid, or a combination thereof. Additionally or alternatively, the sorbent can be lime, slaked lime, hydrated lime, calcium hydroxide, zeolites, mesoporous silicas, and/or metal-organic frameworks. In some embodiments, the sorbent is a low molecular weight amine with a molecular weight of less than 1,000 atomic mass units, 900 atomic mass units, 800 atomic mass units, 700 atomic mass units, 600 atomic mass units, 500 atomic mass units, 400 atomic mass units, or within a range of 400-900 atomic mass units or an increment therebetween. In some embodiments, lower molecular weight can improve functionality of the system.

The first zone 104 can be the area outside or separate from the second zone 106, and is an absorption zone in which the web 102 absorbs carbon dioxide. The second zone 106 can generally have a higher temperature than that of the first zone 104 and constitute an area in which the web desorbs carbon dioxide. For example, the first zone 104 can be a carbon dioxide absorption zone and the second zone 106 can be a carbon dioxide desorption zone, thereby enabling the web 102 to capture carbon dioxide, for example, from air or atmosphere in the first zone 104, before moving into the second zone and desorbing the carbon dioxide in a contained environment. The system 100 can then store the carbon dioxide in order to keep the carbon dioxide separate from the atmosphere.

The second zone 106 can be an enclosed unit configured to operate at a pressure less than atmospheric pressure. For example, the pressure can be less than 0.05 bara, 0.1 bara, 0.25 bara, 0.5 bara, 0.75 bara, 1.013 bara, or within a range of 0.05-1.013 bara or an increment therebetween (e.g., 0.8 bara). In some embodiments, the first zone 104 is at atmospheric pressure, while the second zone 106 can be configured to maintain a pressure less than atmospheric pressure. In some embodiments, the second zone operates at or above atmospheric pressure. To achieve and sustain various pressure conditions, the system 100 can include one or more pumps, compressors, vacuum pumps, or ejectors (e.g., blowers 304a-c, as shown in FIGS. 3-9) that can be employed to maintain the desired fluid pressures or fluid flows within the second zone 106 or other elements. Furthermore, the system 100 can include a first pressure sensor configured to measure the pressure within the first zone 104 and a second pressure sensor configured to measure the pressure within the second zone 106. In some embodiments, the system 100 includes a second pressure sensor configured to measure the pressure in the second zone 106 and another pressure sensor configured to measure the pressure in another zone. For example, another zone can be located between the first zone 104 and the second zone 106, at each end of second zone 106 and with partial seals between each zone transition. These sensors can provide data to ensure that the pressure conditions in both zones are maintained as required for optimal operation. The differential pressure between the zones can improve the effective desorption of carbon dioxide in the second zone. For example, lower pressure in the second zone 106 can help carbon dioxide desorb from the web 102 by reducing the partial pressure of carbon dioxide in the surrounding environment, creating a concentration gradient that favors the release of carbon dioxide from the web. For example, a lower pressure results in less adsorbed carbon dioxide and therefore an increase in the release of carbon dioxide. This lower pressure can drive the desorption process, as carbon dioxide molecules move from the higher concentration on the web to the lower concentration in the surrounding area.

The second zone can be an enclosed unit configured to operate at a temperature greater than the first temperature of the first zone 104. In some embodiments, the first zone 104 is at a first temperature and the second zone 106 is at a second temperature greater than the first temperature. For example, the first temperature can be an ambient temperature and the second temperature can be a temperature greater than the ambient temperature. In some embodiments, the second temperature is at least 5 degrees Celsius, 10 degrees Celsius, 15 degrees Celsius, or 20 degrees Celsius greater than the first temperature. In some embodiments, the second temperature is at least 90 degrees Celsius. In some embodiments, the system 100 includes a first temperature sensor configured to measure a first temperature within the first zone 104 and a second temperature sensor configured to measure the second temperature within the second zone. These sensors can provide data to ensure that the temperature conditions in both zones are maintained as required for optimal operation. Higher temperatures can help carbon dioxide desorb from a web because increased thermal energy can weaken the bonds between the carbon dioxide molecules and the web material. This reduction in binding strength can facilitate the release of carbon dioxide from the web's surface. Additionally, higher temperatures can increase the kinetic energy of the carbon dioxide molecules, making it easier for them to overcome adsorption forces and transition into the gas phase.

Figure 4:
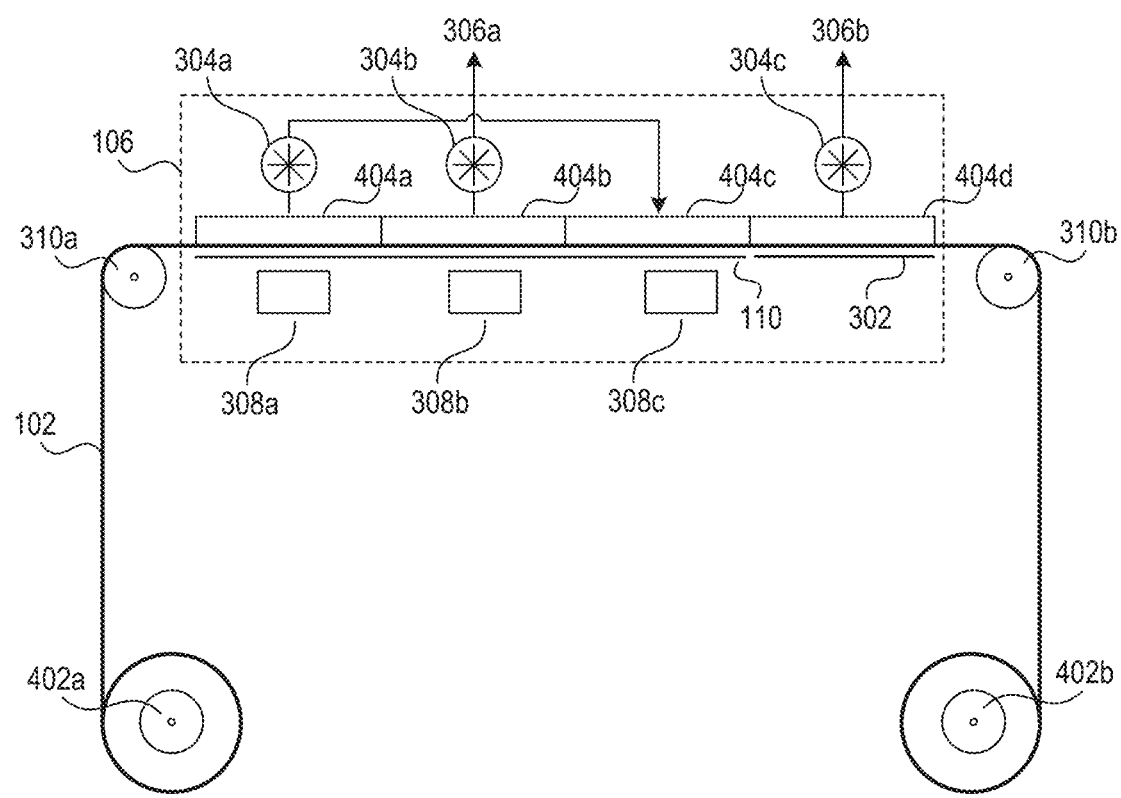
FIG. 4 is a schematic block diagram of an apparatus for removal of carbon dioxide gas, in which the web is not in a continuous loop, in accordance with embodiments of the present technology.

In some embodiments, the second zone 106 includes a housing made up of walls that define a perimeter of the second zone 106. In some embodiments, the housing encapsulates the enclosed unit of the second zone 106. The housing can have a cross-section that is circular, triangular, square, rectangular, pentagonal, hexagonal, or partial shapes or combinations of shapes. The housing can be a single piece or formed of multiple pieces (e.g., pieces welded together). The housing can provide various functions to the desorption enclosure, including securing components, physically containing fluids, separating differing fluids within a single unit, retaining temperature or pressure, and providing insulation. In some embodiments, the housing includes sections in which physical changes of chemical transformations (e.g., separation, absorption, adsorption, desorption, heating, evaporation, filtration, polymerization, isomerization, or other transformation) take place. In some embodiments, the housing includes multiple sections, each having a single physical change of chemical transformation taking place within. For example, a first section or group of sections (e.g., sections 404a-c, as shown in FIG. 4) can involve heating the web 102 and a second section or group of sections can involve desorption (e.g., section 404d, as shown in FIG. 4). In some embodiments, a single housing includes multiple sections that together encapsulate the entire desorption process.

The housing can be made of a suitable material, including metals, ceramics, refractories, insulation, plastics, and/or glasses. In some embodiments, at least one of the walls of the housing can include a chemical component to inhibit reactions at a corresponding surface of the at least one of the walls. This chemical component can be selected based on its ability to prevent unwanted chemical interactions that could degrade the integrity or performance of the second zone 106. For example, the chemical component can prevent reactions with a surface in the interior portion of the housing, such as corrosion, oxidation, or a reduction reaction. The inclusion of such a chemical component can enhance the durability and longevity of the housing, ensuring that it remains effective in its role. Additionally, the design of the walls can be optimized to provide structural support while minimizing potential interferences with the processes occurring within the second zone 106.

The second zone 106 can exist between at least two objects, each having a surface that is approximately planar and that is parallel to the corresponding surface of the other object. The gap between the two surfaces of these two objects can be considered the second zone 106. The alignment of the surfaces can be achieved through the use of a material to separate the surfaces. The separating material can be incompressible or compressible, such as an elastomer or other polymeric seals or sealing materials. These materials can include Viton, ethylene propylene diene monomer (EPDM), fluorinated ethylene propylene (FEP), rubber, polyurethane, polybutadiene, neoprene, and/or silicone. The objects themselves can be composed of one or more materials or compositions and can include multiple component parts with varying thicknesses. At least one of the surfaces can be comprised, partially or fully, of a material that has a low resistance to heat transfer, such as a metal. This can include metals such as steel, copper, zinc, aluminum, and/or their alloys. The thickness of this surface can be less than ½ inch, less than ⅛ inch, less than 0.127 inches, or another thickness. In some embodiments, heat is provided to the other side of the material or object (e.g., the side opposite of the gap) using any of the methods described in greater detail below in relation to the heating mechanism 108. In some embodiments, the other side of the material or object (e.g., the side opposite of the gap) has regular or irregular variation in surface height or roughness, such as fins, dimples, or ridges, to improve heat transfer.

The heating mechanism 108 can be located within the second zone 106. The heating mechanism 108 can be configured to increase a temperature of the second zone at least to a second temperature greater than a first temperature of the first zone 104. The rollers 310a-d or the drive system can be configured to transport the web across the heating mechanism 108 within the second zone. For example, the heating mechanism 108 can be located physically below the web. The heating mechanism 108 can heat the web directly or indirectly. In some embodiments, the heating mechanism 108 is not in direct contact or fluid contact with the web 102.

The heating mechanism 108 can include an electric resistive heater, an electric radiative heater, or a microwave heater. The heating mechanism 108 can include radiative heaters, infrared (IR) heaters, near-infrared (NIR) heaters, ultraviolet (UV) heaters, radio-frequency (RF) heaters, electric resistive heaters, or a heat exchanger using a hot fluid such as steam or air to provide thermal energy. The system 100 can include resistive heating pads attached to one or more sides of the conductor 110. The heating pads can be mounted to the conductor 110 using thermally conductive adhesive. In some embodiments, the adhesive is aluminum tape. In some embodiments, the heating pads have temperature controllers for controlling the temperature of the heating pads.

The heating mechanism 108 can be configured to include a fluid having a temperature at or above the second temperature, and the fluid cannot directly contact the web. In some embodiments, the fluid that provides the heat is provided as waste heat, heat that is excess to the process's heat requirements, or heat that is not economical to reuse within the process. Thus, the system can use recaptured heat and reduce energy consumption of the overall process. In some embodiments, the fluid has a certain velocity, for example, in the range of 0-100 m/s.

In some embodiments, the heat is provided by transfer of latent heat, for example, by condensation of a fluid fully or partially on a surface or surfaces of objects into which heat flows. In some embodiments, the surface or surfaces have a channel or groove through which condensed fluid flows from the second zone 106 to an exit of the second zone 106. In some embodiments, the condensation of water vapor within the second zone 106 can further contribute to latent heat recovery. For example, the desorption process in the second zone 106 can generate water vapor, which then condenses on colder surfaces with the second zone 106. This can enable the system 100 to recapture some of the latent heat that would otherwise be lost. For example, the system 100 can be configured such that the condensation occurs in a designated area where the temperature is lower, facilitating the condensation and recovery of heat. This heat can be reused within the process in order to reduce the energy consumption required by the system 100.

The heating mechanism can be configured to receive steam having a temperature at or above the second temperature, and the steam does not directly contact the web. Heat can also be provided by passing electric current through the web 102, which can include an electrically conductive material providing an impedance suitable for resistive heating. For example, the web 102 can include a conductor configured to be heated via an electric current, and the heating mechanism 108 can be operably coupled to the conductor such that the heating mechanism is configured to provide the electric current. In some embodiments, the heating mechanism 108 is configured to heat the web 102 using other methods. In some embodiments, the heating mechanism 108 is configured to maintain a fixed heat output or to maintain a temperature set point that can vary in time.

The web 102 can be unsupported in the second zone 106, supported by the rollers 310a-d, or in contact with a solid material acting as a heat exchanger. For example, the web 102 can be in contact with the conductor 110, which can be a solid material acting as a heat exchanger between the heating mechanism 108 and the web 102. The conductor 110 can be made of aluminum or another metal. The conductor 110 can be thermally coupled to the heating mechanism 108 and located between the heating mechanism 108 and the web 102 within the second zone 106, in which the conductor 110 directly contacts the web 102. The conductor 110 can fluidically or spatially isolate the web 102 from the heating mechanism 108. In some embodiments, the conductor 110 is configured in another orientation to facilitate heating of the web 102 in the second zone 106.

In some embodiments, the heating mechanism 108 may be a microwave heater. The system 100 can include non-electrically conductive materials. Water can respond to microwave heating very efficiently and can be involved in the amine group and carbon dioxide bonding. Directing microwave energy of the right frequency at the web can heat the portions of the system 100 where the heat is needed for desorption with very low specific energy. In some embodiments, this embodiment operates without the conductor 110.

In some embodiments, the controller 112 is operably coupled to the apparatus. The controller 112 can provide the function of controlling a drive system (e.g., rollers), controlling the transport of the web 102, and/or monitoring or controlling process variables in the system, such as pressure, temperature, flow, and/or composition. The controller 112 can include process and mechanical instruments, a computer, a controller, a programmable logic controller, a distributed control system, or a supervisory control and data acquisition (SCADA), other electronic or other controller, and final control elements such as heaters, valves, pumps, and/or motors. The controller 112 can be configured to monitor the first pressure sensor and the second pressure sensor, as well as the first temperature sensor and the second temperature sensor, described above. The controller 112 can be a part of every system and/or apparatus described herein.

Figure 3:
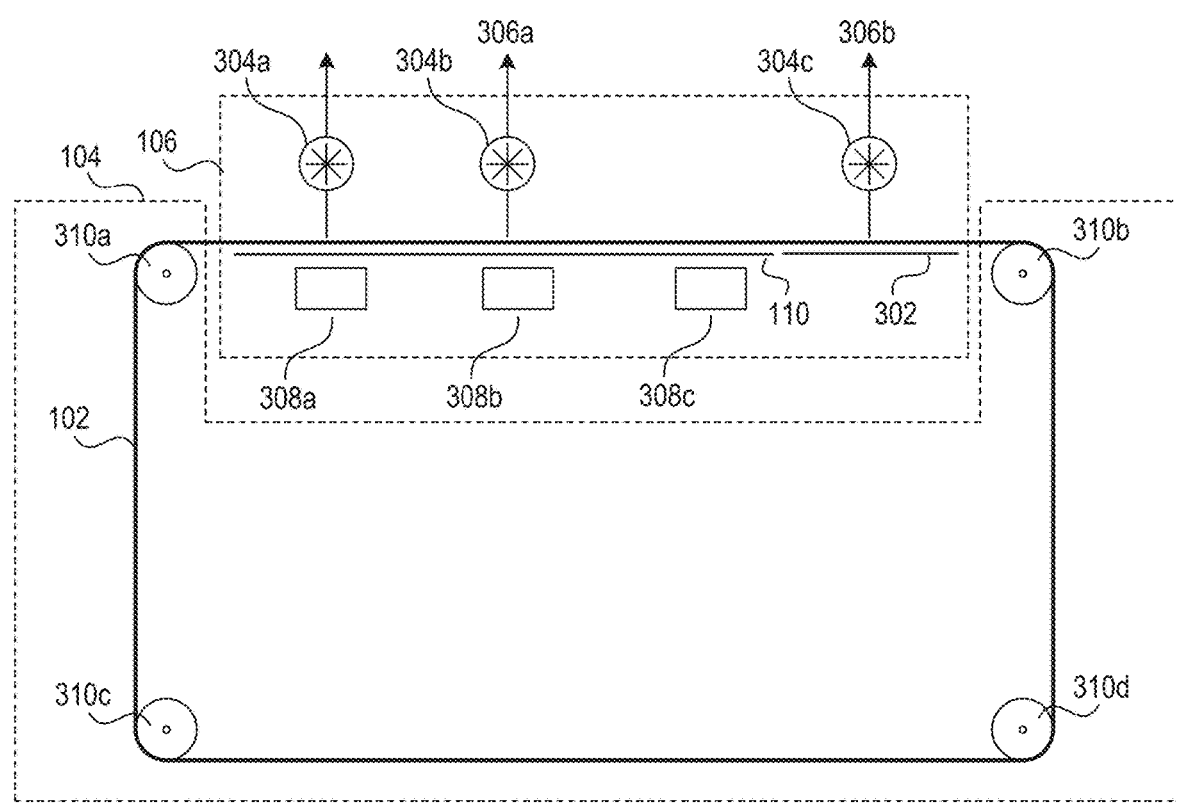
FIG. 3 is a schematic block diagram of an apparatus for removal of carbon dioxide gas, in which the web is in a continuous loop, in accordance with embodiments of the present technology.

FIG. 3 is a schematic block diagram of an apparatus for removal of carbon dioxide gas, in accordance with embodiments of the present technology. FIG. 3 can include a system 300 for removal of carbon dioxide gas. In some embodiments, the system 300 includes the system 100 shown in FIGS. 1 and 2. The system 300 can include any of the features and functionality of the system 100 shown in FIGS. 1 and 2. The system 300 can additionally include a plurality of rollers 310a-d configured to maintain the web 102 under tension. The rollers 310a-d can be configured to transport the web 102 between a first zone 104, in which the web 102 can be exposed to air or atmosphere, to a second zone 106. The system 100 can further include a second conductor 302 downstream of the conductor 110 within the second zone 106. The system 300 can additionally include blowers 304a-c and fluid outlets 306a-b. In some embodiments, as shown in FIG. 3, the web 102 is part of a closed loop and is recirculated via the drive mechanism (e.g., rollers 310a-d) between the first zone 104 and the second zone 106. In some embodiments, the web 102 and drive system are configured differently, e.g., as shown in FIG. 4. However, any components of the figures described herein can be included regardless of the configuration of the drive system.

The rollers 310a-d can be part of a drive system that moves the web 102 in a first direction and a second direction opposite the first direction. This drive system can be designed to ensure the smooth and continuous movement of the web 102, which can maintain the efficiency and effectiveness of the overall process. In some embodiments, the transport is intermittent in nature by, for example, running for a set period of time (e.g., 30 minutes, 5 hours, etc.). The specific configuration and function of each roller can vary depending on the requirements of the system, and adjustments can be made to optimize performance. The rollers 310a-d can be drive, idle, or tensioning rollers. At least one roller can be a drive roller that moves the web 102 between the first zone 104, where it can be exposed to air or atmosphere, and the second zone 106. In some embodiments, a drive roller includes a gear, chain, or other drive components. In some embodiments, the second zone includes multiple sections, such as a first section (e.g., section 404a, as discussed in relation to FIG. 4), a second section (e.g., section 404b, as discussed in relation to FIG. 4) downstream of the first section, a third section (e.g., section 404c, as discussed in relation to FIG. 4) downstream of the second section, a fourth section (e.g., section 404d, as discussed in relation to FIG. 4) downstream of the third section, and so on. The rollers 310a-d can be configured to transport the web from the first section to the second section and then to the third section.

In some embodiments, the heaters 308a-c are a part of a heating mechanism. In some embodiments, the heaters 308a-c are included in or the same as the heating mechanism 108 of system 100. In some embodiments, the heaters 308a-c or the heating mechanism 108 is used to maintain desired temperatures in the second zone 106, in the web 102, in fluids, or in other elements. The heaters 308a-c can be located within the second zone 106, and be configured to increase a temperature of the second zone at least to a second temperature greater than a first temperature of the first zone 104. The rollers 310a-d or the drive system can be configured to transport the web across the heaters 308a-c within the second zone. For example, the heaters 308a-c can be located physically below the web. The heaters 308a-c can heat the web directly or indirectly. In some embodiments, the heaters 308a-c are not in direct contact or fluid contact with the web 102.

The heaters 308a-c can include one or more types of heating mechanisms. For example, the heaters 308a-c can include an electric resistive heater, an electric radiative heater, or a microwave heater. The heaters 308a-c can include radiative heaters, IR heaters, NIR heaters, UV heaters, RF heaters, electric resistive heaters, or a heat exchanger using a hot fluid such as steam or air to provide thermal energy. The heaters 308a-c can be configured to include a fluid having a temperature at or above the second temperature, and the fluid does not directly contact the web. The heating mechanism can be configured to receive steam having a temperature at or above the second temperature, and the steam does not directly contact the web. Heat can also be provided by passing electric current through the web 102, which can include an electrically conductive material providing an impedance suitable for resistive heating. For example, the web 102 can include a conductor configured to be heated via an electric current, and the heaters 308a-c can be operably coupled to the conductor such that the heating mechanism is configured to provide the electric current. In some embodiments, the heaters 308a-c are configured to heat the web 102 using other methods.

In some embodiments, the conductor 110 is a first conductor and the system 300 further includes the second conductor 302. The second conductor 302 can be located downstream of the first conductor within the second zone, based on the direction of the web through the second zone. In some embodiments, the second conductor 302 is located adjacent to a certain section (e.g., section 404d, as shown in FIG. 4). In some embodiments, the conductor 110 has a temperature at or greater than the second temperature, such that the conductor 110 facilitates heating the web 102. The second conductor 302 can be at a temperature lower than the second temperature, such that it is configured to recapture heat from the web 102. For example, the web 102, which has been heated by the heaters 308a-c, subsequently comes into contact with the second conductor 302, which is at a lower temperature. Accordingly, the web 102 can heat the second conductor 302, allowing some of the heat to be recaptured by system 300. The system 300 can utilize some of the recaptured heat, thereby decreasing the energy consumption of the overall process.

The blowers 304a-c can be configured to impart velocity to the air in contact with the web with a mechanical device. The blowers 304a-c can include a vacuum, a pump, or a compressor. The blowers 304a-c can be located within the second zone 106 and physically above the web 102 or the heaters 308a-c. In some embodiments, the blowers 304a-c can be configured to direct fluid away from the second zone 106. For example, a first blower can be configured to direct fluid toward or away from the first zone 104, and a second blower can be configured to direct fluid away from the second zone. One or more of the blowers 304a-c can be configured to create a pressure differential between the first zone 104 and the second zone 106, wherein the second zone 106 is configured to operate at a pressure less than atmospheric pressure and a temperature greater than the first temperature of the first zone 104. In some embodiments, one or more of the blowers 304a-c are configured to direct air away from a first portion of the web 102 and toward another portion of the web 102, as discussed in greater detail in relation to FIG. 4.

The fluid outlets 306a-b can remove fluids from the second zone 106. The fluid communication between the interior and exterior of the second zone 106 can be facilitated by one or more of the fluid outlets 306a-b. This fluid communication can be regulated by the housing and, in certain embodiments, by seals where the web enters and exits the second zone 106. The fluid outlets 306a-b can provide the function of preventing or reducing fluid communication from one side of the seal to the other. The seals are discussed in greater detail in relation to FIG. 9.

FIG. 4 is a schematic block diagram of the apparatus in which a web is not in a continuous loop. FIG. 4 can include a system 400 for removal of carbon dioxide gas, in accordance with embodiments of the present technology. The system 400 can include any of the features and functionality shown and/or described with reference to the system 100 and the system 300 as shown in FIGS. 1, 2, and 3.

The system 400 can additionally include rollers 402a-b and sections 404a-d. The rollers 402a-b can be utilized to feed the web 102 from one roller (e.g., 402a) through the second zone 106 and onto another roller (e.g., 402b), and then back from the roller that had been accumulating the web (e.g., 402b) to the roller that had been feeding the web (e.g., 402a). Such embodiments enable the web to be transported with lower tension compared to what is required for a continuous loop and drive roller, as illustrated in FIGS. 1, 2, and 3. Rollers 402a and 402b can alternate between functioning as the drive roller, which accumulates the web, and other rollers, which feed the web.

In some embodiments, the second zone 106 has multiple sections 404a-d, including a first section 404a, a second section 404b downstream of the first section, a third section 404c downstream of the second section, and a fourth section 404d downstream of the third section. The heating mechanism can include a first heating mechanism adjacent to the first section 404a and upstream of the second section 404b, as well as a second heating mechanism adjacent to the second section 404b and upstream of the third section 404c.

In some embodiments, the heating mechanism includes a third heating mechanism adjacent to the third section 404c and upstream of the fourth section 404d. The drive system can include rollers (e.g., rollers 402a-b) configured to transport the web 102 from the first section to the second section then to the third section, with a blower positioned adjacent to the third section and downstream of the second section. In some embodiments, the drive system includes rollers (e.g., rollers 402a-b) configured to transport the web 102 from the first section to the second section to the third section, then to the fourth section, with a blower positioned adjacent to the fourth section and downstream of the third section. In some embodiments, other configurations are utilized.

The sections 404a-d can facilitate the diversion of fluid exiting from one section of the second zone 106 to another section, as demonstrated by the fluid communication between blower 304a and a section of the second zone 106. In some embodiments, the second zone 106 operates one or more of the sections 404a-d of the second zone 106 at a pressure less than ambient pressure. Blowers 304a-c can be utilized to produce such a reduced pressure. The blowers can be mechanical in nature or can be ejectors. In some embodiments, air and water are removed from the web 102 by the blower 306a in the section closest to where the web 102 enters the second zone 106. Additionally or alternatively, the blower 304a is configured to direct air from the first section to the second section, the third section, or the fourth section and toward the web 102.

In some embodiments, the housing includes different sections (e.g., the sections 404a-d) in which physical changes of chemical transformations (e.g., separation, absorption, adsorption, desorption, heating, evaporation, filtration, polymerization, isomerization, or other transformation) take place. In some embodiments, the housing includes sections 404a-d, each having a single physical change of chemical transformation taking place within. For example, a first section can involve heating the web 102 and a second section can involve desorption. In some embodiments, a single housing includes multiple sections that together encapsulate the entire process.

Figure 5:
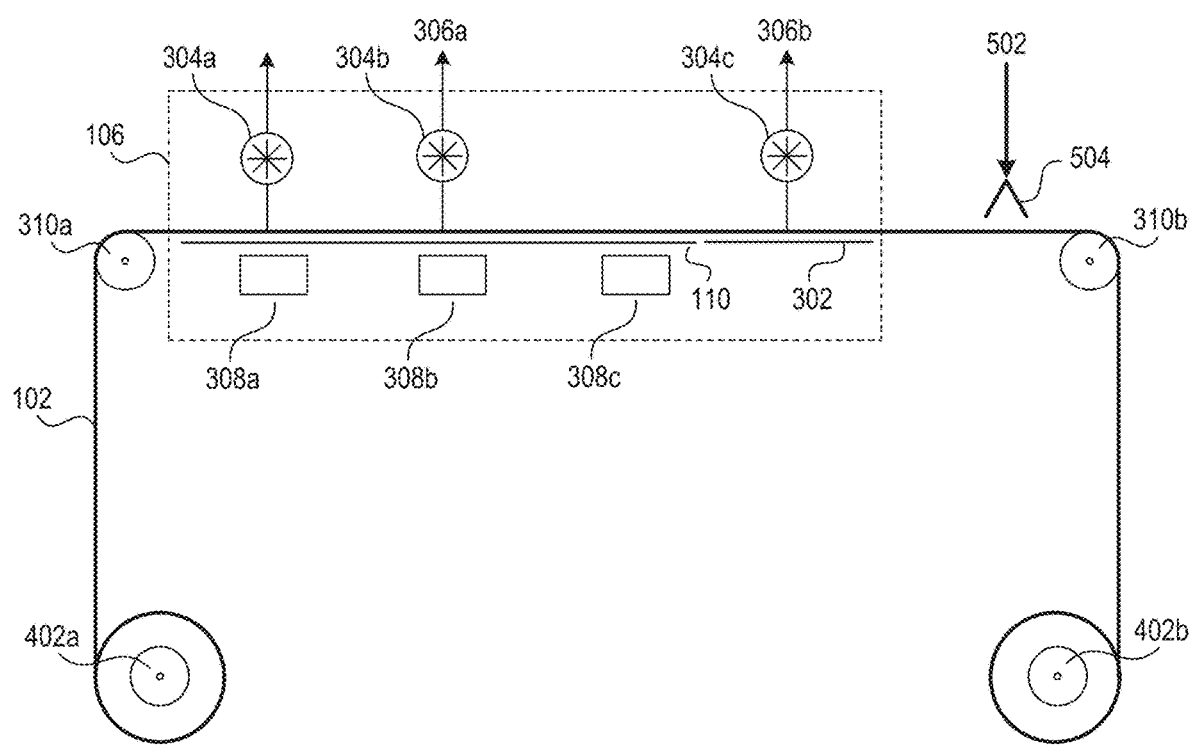
FIG. 5 is a schematic block diagram of an apparatus including an inlet for adding additional sorbent to a web, in accordance with embodiments of the present technology.

FIG. 5 is a schematic block diagram of an apparatus including an inlet for adding additional sorbent to a web, in accordance with embodiments of the present technology. FIG. 5 includes a system 500 for removal of carbon dioxide gas, and can include any of the features and functionality shown and/or described with reference to the systems 100, 300, or 400 of FIGS. 1, 2, 3 and 4. The system 500 can additionally include an inlet 502 for delivery of sorbent and a delivery system 504 for delivery of the sorbent.

The inlet 502 can enable additional carbon dioxide sorbent to be added to the web 102 after installation and initial operation of the process. The additional sorbent can be fed into the inlet 502 in aqueous or non-aqueous solution, in suspension or in solid form. In some embodiments, such an addition is less preferred if the sorbent is polyethyleneimine or other amino polymer. The second zone 106 can provide the heat to evaporate any solvent and affix the sorbent molecule to the web. The carbon dioxide sorbent can be delivered to the web via the delivery system 504. In some embodiments, the delivery system can include spray nozzles, drip heads, or other liquid delivery mechanism. Additional sorbent can be added continuously or intermittently. In some embodiments, sorbent is added to the web 102 at a point in time after the initial operation of the system.

Figure 6:
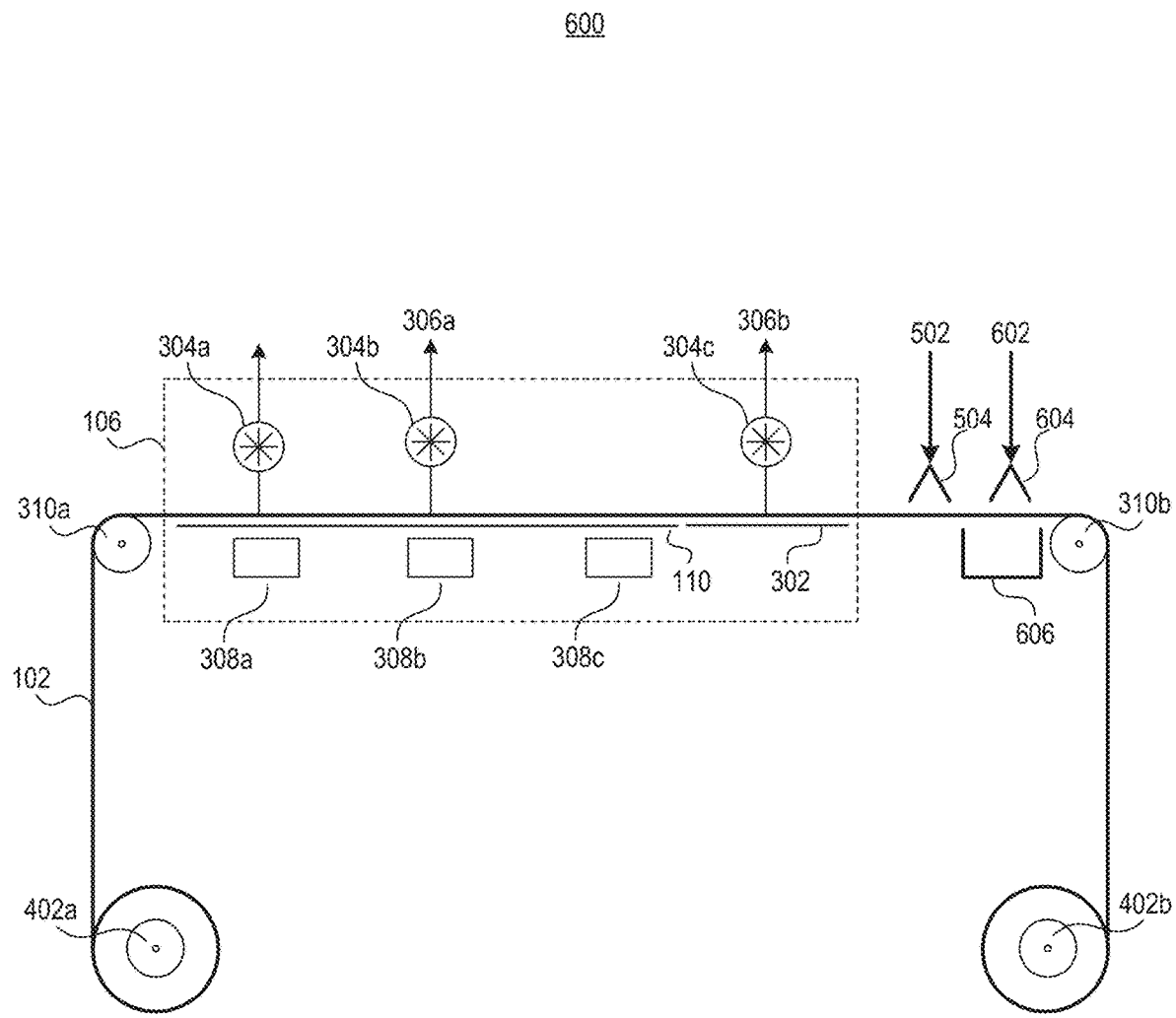
FIG. 6 is a schematic block diagram of an apparatus including an inlet and collector for washing degraded and non-degraded sorbent from a web, in accordance with embodiments of the present technology.

FIG. 6 is a schematic block diagram of the apparatus including an inlet and collector for washing degraded and non-degraded sorbent from a web, in accordance with embodiments of the present technology. FIG. 6 includes a system 600 for removal of carbon dioxide gas, and can include any of the features and functionality shown and/or described with reference to the systems 100, 300, 400, or 500 of FIGS. 1, 2, 3, 4, and 5. The system 600 can additionally include an inlet 602 for feeding a solvent into the system 600 to collect degraded and non-degraded sorbent, a wash system 604 for washing the web 102, and a collector 606 for collecting the solvent and sorbent.

A suitable solvent, such as water, can be fed into the inlet 602 and onto the web via the wash system 604. In some embodiments, the wash system 604 can include spray nozzles, drip heads, or other liquid delivery mechanism. Additional solvent can be added continuously or intermittently. Solvents containing degraded and non-degraded sorbent can be collected in the collector 606. The collector 606 can be configured to receive condensed fluid within the second zone 106. In some embodiments, the collector 606 is at a temperature lower than the second temperature such that fluids (e.g., solvent containing degraded and non-degraded sorbent) condense onto or into the collector 606. In some embodiments, the system 600 removes the fluids collected by the collector 606 from the second zone 106.

Figure 7:
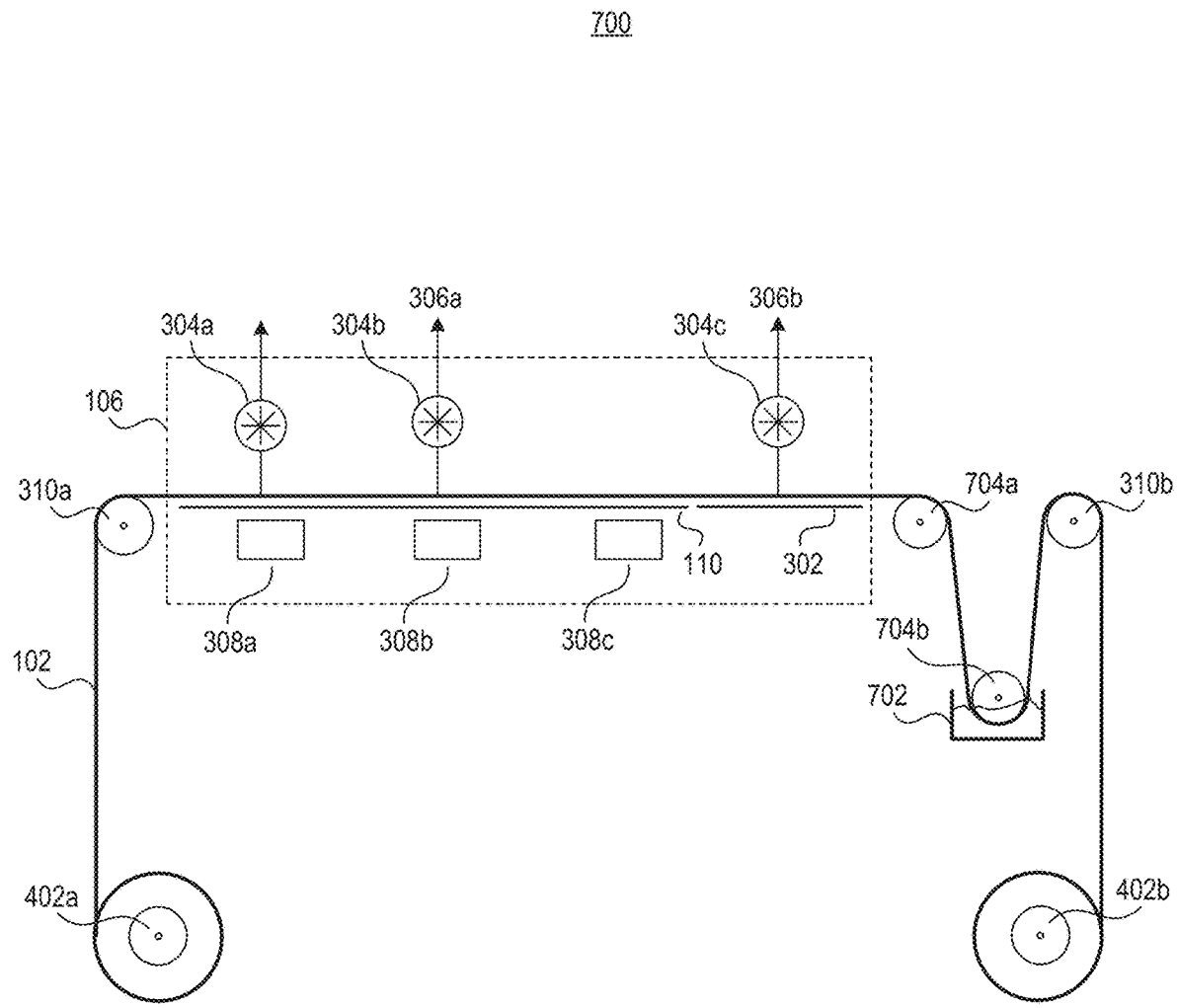
FIG. 7 is a schematic block diagram of an apparatus including a bath for adding additional sorbent to a web, in accordance with embodiments of the present technology.

FIG. 7 is a schematic block diagram of the apparatus including a bath for adding additional sorbent to a web, in accordance with embodiments of the present technology. FIG. 7 includes a system 700 for removal of carbon dioxide gas, and can include any of the features and functionality shown and/or described with reference to the systems 100, 300, 400, 500, or 600 of FIGS. 1, 2, 3, 4, 5, and 6. The system 700 can additionally include a bath 702 for adding sorbent to the web 102, as well as additional rollers 704a-b.

In some embodiments, additional sorbent is added to web 102 after installation and operation of the process by immersing the web in a bath 702 of aqueous or non-aqueous solution, in suspension or in solid form. In some embodiments, the bath 702 is used for removing degraded and non-degraded sorbent from the web 102. In some embodiments, the wash system depicted by system 600 shown in FIG. 6 can be used with the bath 702 of system 700. In some embodiments, the additional rollers 704a-b support and direct the web 102 through the bath 702.

Figure 8:
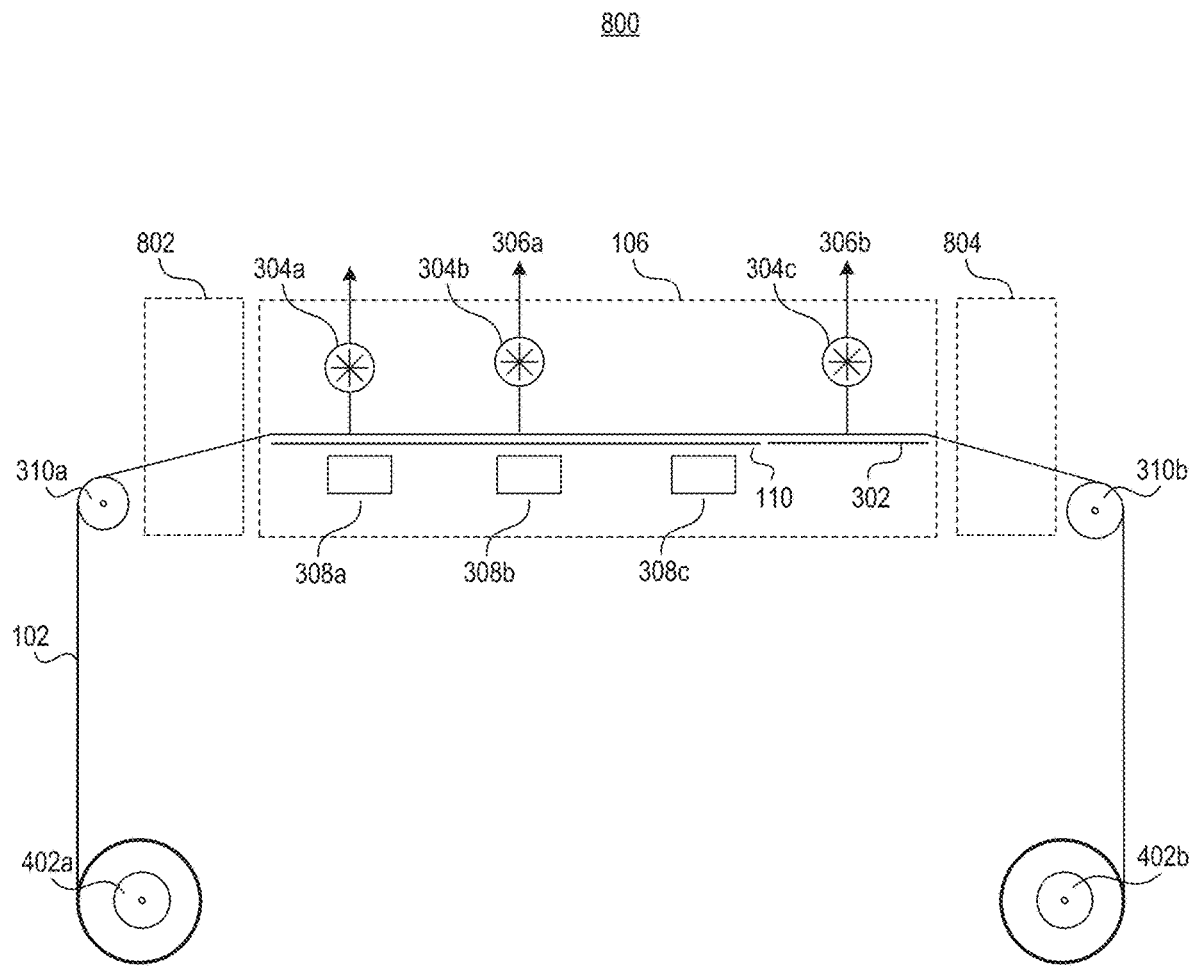
FIG. 8 is a schematic block diagram of an apparatus including rollers closest to a second zone that are not located on a plane of a path of a web through the second zone, in accordance with embodiments of the present technology.

FIG. 8 is a schematic block diagram of the apparatus rollers closest to a second zone that are not located on a plane of a path of a web through the second zone, in accordance with embodiments of the present technology. FIG. 8 includes a system 800 for removal of carbon dioxide gas, and can include any of the features and functionality shown and/or described with reference to the systems 100, 300, 400, 500, 600, or 700 of FIGS. 1, 2, 3, 4, 5, 6, and 7. The system 800 can additionally include rollers 310a-b that are not located on the plane of the path of the web 102 through the second zone 106. The system 800 can additionally include one or more additional zones.

In some embodiments, the contact between the web and a heat transfer surface in the second zone 106 is modified by locating the rollers 310a-b in proximity to where the web 102 enters and exits the second zone 106, such that the heat transfer to/from the web 102 does not occur along a surface that is planar throughout an entirety of the second zone 106. Doing so can improve the contact of the web 102 with the heat transfer surface in the second zone 106. In some embodiments, devices other than rollers can be utilized to achieve improved contact of the web 102 and a heat transfer surface in the second zone 106.

The system 800 can include one or more additional zones. For example, in some embodiments, the system 800 includes a third zone 802. The third zone 802 can be used for air removal and can have less fluidic communication with the first and second zones. The third zone 802 can be in fluid communication with the second zone 106 for control of the differential pressure between the second zone 106 and the third zone 802. In some embodiments, the third zone 802 is located upstream of the second zone 106 in the path of the web 102. For example, the web 102 can encounter the third zone 802 for air removal before the web 102 enters the second zone 106 for desorption. The air removal can eliminate air pockets or voids within a porous material making up the web 102. Moreover, the air removal can reduce loss of carbon dioxide from the second zone 106.

In some embodiments, the system 800 includes a fourth zone 804 downstream of the second zone 106 in the path of the web 102. The fourth zone 804 can be a differential pressure zone designed similarly to the air removal zone and can be positioned in the path of web movement after the web 102 exits the second zone 106. The fourth zone 804 can function to manage the pressure differences across the web 102, ensuring that remaining air or gases are effectively removed. By maintaining a controlled pressure environment, the fourth zone 802 can help in stabilizing the web 102 and enhancing the overall quality of the material. The fourth zone 804 can also reduce leakage of air from the first zone 104 into the second zone 106 or leakage of carbon dioxide from the first zone 106 to the first zone 104. All embodiments can include these or other zones, even if not illustrated in the figures.

Figure 9:
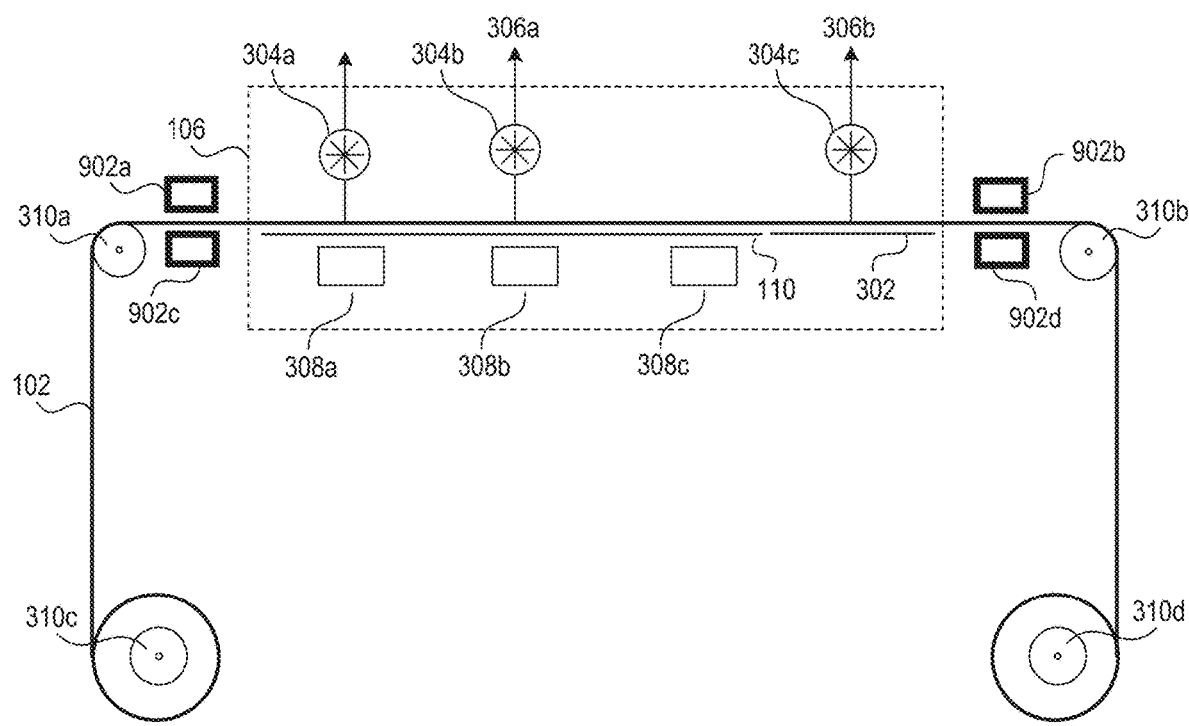
FIG. 9 is a schematic block diagram of an apparatus including seals for limiting fluid communication from inside a second zone to outside of the second zone, in accordance with embodiments of the present technology.

FIG. 9 is a schematic block diagram of the apparatus including seals for limiting fluid communication from inside a second zone to outside of the second zone, in accordance with embodiments of the present technology. FIG. 9 includes a system 900 for removal of carbon dioxide gas, and can include any of the features and functionality shown and/or described with reference to the systems 100, 300, 400, 500, 600, 700, or 800 of FIGS. 1, 2, 3, 4, 5, 6, 7, and 8. The system 900 can additionally include seals 902a-d for limiting fluid communication from inside the second zone 106 to outside of the second zone 106.

In some embodiments, the web 102 moves intermittently and seals 902a-d can compress in a direction perpendicular to the plane defined by the web 102 to make contact with the web 102. The seals 902a-d can compress the web 102 while the web 102 is not in motion to reduce the flow of gas into and out of the second zone 106 in the area of the seals 902a-d. In some embodiments, this can substantially limit fluid communication from inside of the second zone 106 to outside of the second zone 106 to the outlets 306a-b. Alternatively, with a continuously moving web, sealing in the areas where the web 102 enters and exits the second zone 106 can be achieved using various geometries of elastomeric and other polymeric seals, sealing rollers, or a gas curtain. In some embodiments, roller seals, diaphragm seals, or inflatable seals can be used. In some embodiments, in between seals (e.g., between seal 902a and seal 902c and between seal 902b and seal 902d) is an outlet attached to a vacuum pump that removes air from the web 102. This results in less leakage of air into the product gas.

Figure 10:
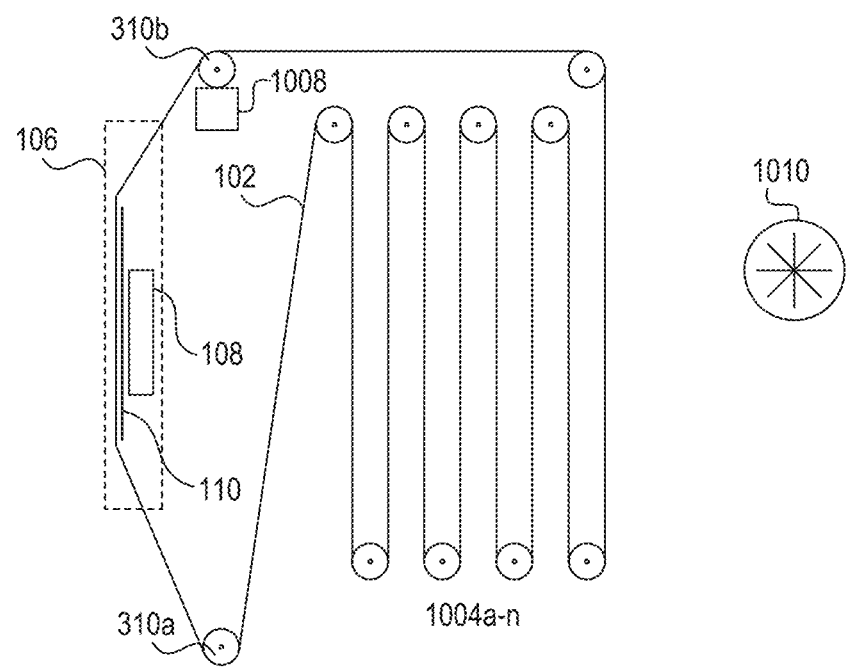
FIG. 10 is a schematic block diagram of an apparatus including additional rollers for tensioning a web, in accordance with embodiments of the present technology.

FIG. 10 is a schematic block diagram of an apparatus including additional rollers for tensioning a web, in accordance with embodiments of the present technology. FIG. 10 includes a system 1000 for removal of carbon dioxide gas, and can include any of the features and functionality shown and/or described with reference to the systems 100, 300, 400, 500, 600, 700, 800, or 900 of FIGS. 1, 2, 3, 4, 5, 6, 7, 8, and 9. The system 1000 can additionally include a roof 1002 above the apparatus, additional rollers 1004a-n, a controller 1008, and a blower 1010.

The roof 1002 can be slightly angled and can provide shelter to the apparatus from sun, rain, snow, or other elements. For example, the roof 1002 can prevent direct precipitation onto the apparatus, including the web 102. This protective feature can ensure that the apparatus remains functional and protected from potential damage caused by exposure to these elements, thereby enhancing its durability and operational efficiency.

The additional rollers 1004a-n can apply additional tension to the web 102. For example, the additional rollers 1004a-n can be moved to increase or reduce tension on the web 102. In some embodiments, the web 102 stretches over time and the additional rollers 1004a-n can increase tension to account for stretching. The additional rollers 1004a-n can also increase or reduce tension to account for environmental or other change affecting the web 102. The additional rollers 1004a-n can enable additional time for carbon dioxide adsorption in a small footprint. In some embodiments, the additional rollers 1004a-n tension the web 102 back and forth across an area that receives airflow from the blower 1010. For example, the blower 1010 can be a fan or vacuum configured to impart velocity to the air surrounding the web 102 moving through this area.

In some embodiments, the controller 1008 is operably coupled to the system 1000. The controller 1008 can provide the function of controlling the drive system (e.g., rollers), controlling the transport of the web 102, and monitoring or controlling process variables in the system, such as pressure, temperature, flow, and/or composition. The controller 1008 can include process and mechanical instruments, a computer, a controller, a programmable logic controller, a distributed control system, or a SCADA, other electronic or other controller, and final control elements such as heaters, valves, pumps, and/or motors. The controller 1008 can be configured to monitor the first pressure sensor and the second pressure sensor, described above in relation to system 100. The controller 1008 can be configured to monitor the first temperature sensor and the second temperature sensor, described above in relation to system 100.

Figure 11:
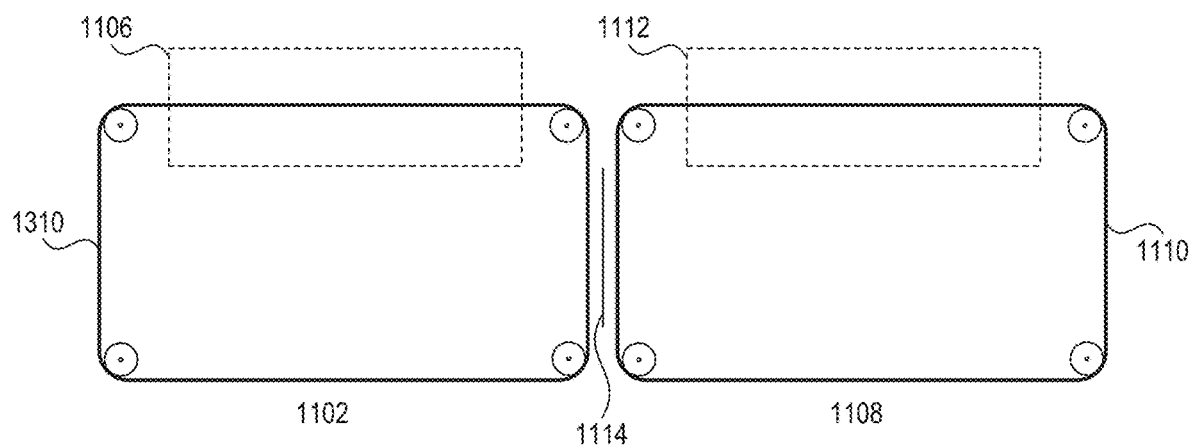
FIG. 11 is a schematic block diagram of a modular apparatus for removal of carbon dioxide gas, in accordance with embodiments of the present technology.

FIG. 11 is a schematic block diagram of a modular apparatus for removal of carbon dioxide gas, in accordance with embodiments of the present technology. FIG. 11 includes a system 1100 for removal of carbon dioxide gas, and can include any of the features and functionality shown and/or described with reference to the systems 100, 300, 400, 500, 600, 700, 800, 900, or 1000 of FIGS. 1, 2, 3, 4, 5, 6, 7, 8, 9, and 10.

In some embodiments, system 1100 includes two or more apparatuses located adjacent to each other. Each apparatus of system 1100 can represent any of the apparatuses illustrated by and described in relation to FIGS. 1-10. In some embodiments, system 1100 includes a first apparatus 1102 and a second apparatus 1108. In some embodiments, the first apparatus 1102 includes a web 1310 and a second zone 1106. In some embodiments, the second zone 1106 includes any of the elements discussed in relation to the second zone 106 in relation to FIGS. 1-10. In some embodiments, the second apparatus 1108 includes a web 1110 and a second zone 1112. In some embodiments, the second zone 1112 includes any of the elements discussed in relation to the second zone 106 in relation to FIGS. 1-10. In some embodiments, the web 1310 and the web 1110 are a singular web that feeds through both apparatuses sequentially. In some embodiments, the web 1310 and the web 1110 are separate.

In some embodiments, system 1100 includes a conductor 1114 located between the first apparatus 1102 and the second apparatus 1108. In some embodiments, the webs move clockwise in both apparatuses. The web 1310 exiting the second zone 1106 has been heated to a higher temperature (e.g., the second temperature). The web 1310 can subsequently contact the conductor 1114 and therefore imparts heat into the conductor 1114. This allows the system 1100 to recapture some of the heat used in the process of carbon capture. The conductor 1114 can also contact the web 1110 as it moves clockwise toward the second zone 1112. The conductor 1114 can heat the web 1110, which reduces the energy that must be used to heat the web 1110 within the second zone 1112. The system 1100 can include many such conductors between modular apparatuses as a way of recapturing heat used in the process.

III. Methods for Carbon Capture

FIG. 12 is a block flow diagram of a method 1200 for removal of carbon dioxide gas, in accordance with embodiments of the present technology. The method 1200 can include providing a web comprising a sorbent configured to absorb carbon dioxide, wherein the sorbent comprises an amine group and/or a molecular weight of less than 1,000 AMUs (process portion 1202). The method 1200 can further include transporting the web via a drive mechanism from (i) a first zone to (ii) a second zone within an at least partially enclosed area (process portion 1204). For example, the first zone can be a carbon dioxide absorption zone and the second zone can be a carbon dioxide desorption zone.

The method 1200 can further include heating a portion of the web within the second zone to a predetermined minimum temperature, such that an affinity of the web within the second zone to absorb carbon dioxide decreases (process portion 1206). In some embodiments, the method 1200 includes heating the portion of the web such that the first zone is at a first temperature and the second zone is at a second temperature at least 5 degrees Celsius greater than the first temperature. In some embodiments, heating the portion of the web within the second zone to the predetermined minimum temperature includes transporting the web, via the drive mechanism, across a first plate that is in contact with a heating mechanism within the second zone. In some embodiments, heating the portion of the web within the second zone to the predetermined minimum temperature includes directing steam having a temperature at or above the predetermined minimum temperature toward a conductor positioned between a heating mechanism and the web.

The method 1200 can further include removing fluid including carbon dioxide from the second zone (process portion 1208). The method 1200 can further include removing fluid including at least 0.1% carbon dioxide from the second zone. In some embodiments, the fluid includes carbon dioxide and water. In some embodiments, carbon dioxide makes up as much as 99% of the fluid.

The method 1200 can further include removing heat, via a conductor, from a portion of the web downstream of the second zone. For example, the method 1200 can further include transporting the web, via the drive mechanism, across a first conductor within the first zone and a second conductor within the second zone, where the second conductor is positioned downstream of the first conductor and causes the second conductor to recapture heat from the web.

The method 1200 can further include measuring a rate at which a collector receives condensed fluid within the second zone, where the collector is at a temperature lower than the predetermined minimum temperature. The method 1200 can further include adjusting the temperature of the collector based on the rate.

The method 1200 can further include directing the fluid away from the second zone. The method 1200 can further include creating a pressure differential between the first zone and the second zone. The method 1200 can further include reducing an air pressure in the second zone to less than atmospheric pressure. The method 1200 can further include imparting velocity to the air in contact with the web in the first zone. In some embodiments, the second zone includes a first section and a second section downstream from the first section, and the method 1200 can further include directing air from the first section to the second section and toward the web in the second section.

The method 1200 can further include adding the carbon dioxide sorbent to the web subsequent to initiating transportation of the web from the first zone to the second zone. For example, additional sorbent can be fed into an inlet in aqueous or non-aqueous solution, in suspension or in solid form. In some embodiments, such an addition is not possible if the sorbent is polyethyleneimine or other amino polymer. The second zone can provide the heat to evaporate solvent and affix the sorbent molecule to the web. The carbon dioxide sorbent can be delivered to the web via a delivery system. In some embodiments, the delivery system can include spray nozzles, drip heads, or other liquid delivery mechanism.

In some embodiments, the web is part of a closed loop, and the method 1200 can further include recirculating the closed loop via the drive mechanism between the first zone and the second zone. In some embodiments, the method 1200 includes feeding the web from one through the second zone and onto another roller and then back from the roller that had been accumulating the web to the roller that had been feeding the web. In some embodiments, the method 1200 includes other configurations.

The method 1200 can further include maintaining the web at or above a predetermined minimum tension within the second zone and/or the first zone.

The method 1200 can further include controlling the speed of the web via a speed control unit and adjusting the speed of the web via the speed control unit based on a temperature of the web, a temperature of the second zone, or a carbon dioxide removal rate. For example, the method 1200 can further include adjusting the power consumption of the apparatus to match a power source that is renewable with non-constant generation (e.g., renewable without storage) or power with time-dependent pricing.

IV. Conclusion

It will be apparent to those having skill in the art that changes can be made to the details of the above-described embodiments without departing from the underlying principles of the present disclosure. In some cases, well known structures and functions have not been shown or described in detail to avoid unnecessarily obscuring the description of the embodiments of the present technology. Although steps of methods can be presented herein in a particular order, alternative embodiments can perform the steps in a different order. Similarly, certain aspects of the present technology disclosed in the context of particular embodiments can be combined or eliminated in other embodiments. Furthermore, while advantages associated with certain embodiments of the present technology have been disclosed in the context of those embodiments, other embodiments also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Where context permits, singular or plural terms can also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" can be based on both condition A and condition B without departing from the scope of the present disclosure. In other words, as used herein, the phrase "based on" shall be construed in the same manner as the phrase "based at least in part on" or the phrase "based at least partially on."

Throughout this disclosure, the singular terms "a," "an," and "the" include plural referents unless the context clearly indicates otherwise. Additionally, the terms "comprising," "including," and "having" should be interpreted to mean including at least the recited feature(s) such that any greater number of the same feature and/or additional types of other features are not precluded.

Reference herein to "one embodiment," "an embodiment," "some embodiments," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics can be combined in any suitable manner in one or more embodiments.

Unless otherwise indicated, all numbers and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses (1, 2, 3, etc.) for convenience. These are provided as examples and do not limit the present technology. It is noted that any of the dependent clauses can be combined in any combination and placed into a respective independent clause. The other clauses can be presented in a similar manner.

1. An apparatus for removal of carbon dioxide gas, the apparatus comprising:
    a web comprising a sorbent configured to absorb carbon dioxide, wherein the sorbent comprises an amine group and/or a molecular weight of less than 1,000 atomic mass units (AMUs);
    a drive system operably coupled to the web, wherein, in operation:
        the drive system transports the web from a first zone, in which the web is exposed to gas, to a second zone, and
        the first zone is at a first temperature and the second zone is at a second temperature at least 5 degrees Celsius greater than the first temperature; and
    a heating mechanism configured to increase a temperature of the second zone at least to the second temperature.

2. The apparatus of any one of the examples herein, further comprising a blower configured to direct fluid away from the second zone.

3. The apparatus of any one of the examples herein, further comprising (i) a first blower configured to direct fluid toward or away from the first zone, and (ii) a second blower configured to direct fluid away from the second zone.

4. The apparatus of any one of the examples herein, wherein the second zone comprises an enclosed unit configured to operate at a pressure less than atmospheric pressure and a temperature greater than the first temperature.

5. The apparatus of any one of the examples herein, further comprising a blower configured to create a pressure differential between the first zone and the second zone, wherein the second zone is configured to operate at a pressure less than atmospheric pressure and a temperature greater than the first temperature.

6. The apparatus of any one of the examples herein, wherein the first zone is at atmospheric pressure and the second zone is configured to be at less than atmospheric pressure.

7. The apparatus of any one of the examples herein, wherein the second zone comprises a housing including a plurality of walls that define a perimeter of the second zone.

8. The apparatus of any one of the examples herein, wherein the second zone comprises a housing including a plurality of walls, wherein at least one of the walls includes a chemical component to inhibit reactions at a corresponding surface of the at least one of the walls.

9. The apparatus of any one of the examples herein, wherein the first zone is a carbon dioxide absorption zone and the second zone is a carbon dioxide desorption.

10. The apparatus of any one of the examples herein, wherein the second temperature is at least 85 degrees Celsius.

11. The apparatus of any one of the examples herein, wherein the heating mechanism comprises an electric resistive heater, an electric radiative heater, or a microwave heater.

12. The apparatus of any one of the examples herein, wherein the heating mechanism is within the second zone, and wherein the drive system is configured to transport the web across the heating mechanism within the second zone.

13. The apparatus of any one of the examples herein, wherein the heating mechanism is within the second zone and physically below the web and the blower is within the second zone and physically above the web and/or the heating mechanism.

14. The apparatus of any one of the examples herein, wherein the heating mechanism is configured to include a fluid having a temperature at or above the second temperature, and wherein the fluid does not directly contact the web.

15. The apparatus of any one of the examples herein, wherein the heating mechanism is configured to receive steam having a temperature at or above the second temperature, and wherein the steam does not directly contact the web.

16. The apparatus of any one of the examples herein, further comprising a conductor thermally coupled to the heating mechanism and located between the heating mechanism and the web within the second zone, wherein the conductor directly contacts the web.

17. The apparatus of any one of the examples herein, further comprising a conductor thermally coupled to the heating mechanism, and wherein the conductor is located between the heating mechanism and the web within the second zone, such that the conductor fluidically or spatially isolates the web from the heating mechanism.

18. The apparatus of any one of the examples herein, further comprising a conductor thermally coupled to the heating mechanism, wherein the conductor comprises aluminum and/or a metal.

19. The apparatus of any one of the examples herein, further comprising a first conductor and a second conductor downstream of the first conductor within the second zone, wherein the first conductor is at or greater than the second temperature, and wherein the second conductor is at a temperature lower than the second temperature and is configured to recapture heat from the web.

20 The apparatus of any one of the examples herein, wherein the web includes a conductor configured to be heated via an electric current, and wherein the heating mechanism is operably coupled to the conductor such that the heating mechanism is configured to provide the electric current.

21. The apparatus of any one of the examples herein, wherein the heating mechanism is not in direct contact with the web.

22. The apparatus of any one of the examples herein, wherein the sorbent comprises a molecular weight less than 250 AMUs.

23. The apparatus of any one of the examples herein, wherein the sorbent comprises at least one of an amino acid, lysine, glycine, taurine, alkali earth metal salt, or amine.

24. The apparatus of any one of the examples herein, wherein the sorbent comprises at least one of lime, slaked lime, hydrated lime, calcium hydroxide, zeolites, mesoporous silicas, or metal-organic frameworks.

25. The apparatus of any one of the examples herein, wherein the web has a length of at least 5 meters, and wherein no more than 25% of the length of the web is within the second zone at a point in time.

26. The apparatus of any one of the examples herein, wherein the web is part of a closed loop and is recirculated via the drive mechanism between the first zone and the second zone.

27. The apparatus of any one of the examples herein, wherein the second zone includes a first section, a second section downstream of the first section, and a third section downstream of the second section, wherein the heating mechanism is a first heating mechanism adjacent the first section and upstream of the second section, the apparatus further comprising a second heating mechanism adjacent the second section and upstream of the third section, wherein the drive system includes a plurality of rollers configured to transport the web from the first section to the second section and to the third section, and wherein the blower is positioned adjacent the third section and downstream of the second section.

28. The apparatus of any one of the examples herein, wherein the web comprises cotton, cellulose, lignin, jute, flax, abaca, pina, ramie, bagasse, banana, wood, silk, wool, amphibole, wollasatone, palygorskite, nylon, rayon, Modal, diacetate, triacetate, carbon, polyester, PET, PBT, PF, PVC, PP, PE, PAN, Twaron, Kevlar, Nomex, HMPE, elastomers, urethane, Spandex, polyurethane, and/or elastolefin.

29. The apparatus of any one of the examples herein, wherein the blower is a first blower and the second zone includes a first section and a second section downstream of the first section, wherein the apparatus further comprises a second blower configured to direct air from the first section to the second section and toward the web in the second section.

30. The apparatus of any one of the examples herein, further comprising a collector configured to receive condensed fluid within the second zone, wherein the collector is at a temperature lower than the second temperature.

31. A method for removing carbon dioxide gas, the method comprising:
providing a web comprising a sorbent configured to absorb carbon dioxide, wherein the sorbent comprises an amine group and/or a molecular weight of less than 1,000 atomic mass units (AMUs);
transporting the web via a drive mechanism from (i) a first zone to (ii) a second zone within an at least partially enclosed area;
heating a portion of the web within the second zone to a predetermined minimum temperature, such that (i) the first zone is at a first temperature and the second zone is at a second temperature at least 5 degrees Celsius greater than the first temperature, and (ii) an affinity of the web within the second zone to absorb carbon dioxide decreases; and
removing fluid comprising at least 0.1% carbon dioxide from the second zone.

32. The method of any one of the examples herein, wherein heating the portion of the web within the second zone to the predetermined minimum temperature comprises transporting the web, via the drive mechanism, across a first plate that is in contact with a heating mechanism within the second zone.

33. The method of any one of the examples herein, wherein heating the portion of the web within the second zone to the predetermined minimum temperature comprises directing steam having a temperature at or above the predetermined minimum temperature toward a conductor positioned between a heating mechanism and the web.

34 The method of any one of the examples herein, further comprising transporting the web, via the drive mechanism, across a first conductor within the first zone and a second conductor within the second zone, wherein the second conductor is positioned downstream of the first conductor and causes the second conductor to recapture heat from the web.

35. The method of any one of the examples herein, further comprising removing heat, via a conductor, from a portion of the web downstream of the second zone.

36. The method of any one of the examples herein, further comprising:
measuring a rate at which a collector receives fluid within the second zone, wherein the collector is at a temperature lower than the predetermined minimum temperature; and
adjusting the temperature of the collector based on the rate.

37 The method of any one of the examples herein, further comprising directing the fluid away from the second zone.

38. The method of any one of the examples herein, further comprising creating a pressure differential between the first zone and the second zone.

39. The method of any one of the examples herein, further comprising reducing an air pressure in the second zone to less than atmospheric pressure.

40. The method of any one of the examples herein, further comprising imparting velocity to the air in contact with the web in the first zone.

41. The method of any one of the examples herein, wherein the second zone includes a first section and a second section downstream from the first section, the method further comprising directing air from the first section to the second section and toward the web in the second section.

42 The method of any one of the examples herein, further comprising adding the carbon dioxide sorbent to the web subsequent to initiating transportation of the web from the first zone to the second zone.

43. The method of any one of the examples herein, wherein the web is part of a closed loop, further comprising recirculating the closed loop via the drive mechanism between the first zone and the second zone.

44. The method of any one of the examples herein, further comprising maintaining the web at or above a predetermined minimum tension within the second zone and/or the first zone.

45. The method of any one of the examples herein, further comprising controlling the speed of the web via a speed control unit, and adjusting the speed of the web via the speed control unit based on a temperature of the web, a temperature of the second zone, and/or a carbon dioxide removal rate.

46. A system for removal of carbon dioxide gas, the system comprising:
an apparatus comprising:
a web comprising a sorbent configured to absorb carbon dioxide, wherein the sorbent comprises an amine group and/or a molecular weight of less than 1,000 atomic mass units (AMUs);
a drive system operably coupled to the web, wherein, in operation, the drive system transports the web from a first zone, configured to be at a first temperature, toward a second zone, configured to be operated at a second temperature greater than the first temperature; and
a heating mechanism configured to increase a temperature of the second zone at least to the second temperature; and
a controller operably coupled to the apparatus.

47. The system of any one of the examples herein, the apparatus further comprising a blower positioned adjacent the second zone and configured to direct fluid away from the web in the second zone.

48. The system of any one of the examples herein, further comprising (i) a first blower configured to direct fluid toward or away from the first zone, and (ii) a second blower configured to direct fluid away from the second zone.

49. The system of any one of the examples herein, wherein the second zone comprises an enclosed unit configured to operate at a pressure less than atmospheric pressure and a temperature greater than the first temperature.

50. The system of any one of the examples herein, further comprising a blower configured to create a pressure differential between the first zone and the second zone, wherein the second zone is configured to operate at a pressure less than atmospheric pressure and a temperature greater than the first temperature.

51. The system of any one of the examples herein, wherein the second zone comprises an enclosed unit configured to operate at a pressure less than atmospheric pressure and a temperature greater than the first temperature.

52. The system of any one of the examples herein, wherein the first zone is at atmospheric pressure and the second zone is configured to be at less than atmospheric pressure.

53. The system of any one of the examples herein, wherein the apparatus further comprises a first pressure sensor configured to measure a first pressure within the first zone and a second pressure sensor configured to measure a second pressure within the second zone.

54 The system of any one of the examples herein, wherein the controller is configured to monitor the first pressure sensor and the second pressure sensor.

55. The system of any one of the examples herein, wherein the second zone comprises a housing including a plurality of walls that define a perimeter of the second zone.

56 The system of any one of the examples herein, wherein the second zone comprises a housing including a plurality of walls, wherein at least one of the walls includes a chemical component to inhibit reactions at a corresponding surface of the at least one of the walls.

57. The system of any one of the examples herein, wherein the first zone is a carbon dioxide absorption zone and the second zone is a carbon dioxide desorption zone.

58. The system of any one of the examples herein, wherein the second temperature is at least 85 degrees Celsius.

59. The system of any one of the examples herein, wherein the apparatus further comprises a first temperature sensor configured to measure a first temperature within the first zone and a second temperature sensor configured to measure the second temperature within the second zone.

60. The system of any one of the examples herein, wherein the controller is configured to monitor the first temperature sensor and the second temperature sensor.

61. The system of any one of the examples herein, wherein the heating mechanism comprises an electric resistive heater, an electric radiative heater, or a microwave heater.

62. The system of any one of the examples herein, wherein the heating mechanism is within the second zone, and wherein the drive system is configured to transport the web across the heating mechanism within the second zone.

63. The system of any one of the examples herein, wherein the heating mechanism is within the second zone and physically below the web and the blower is positioned within the second zone and physically above the web and/or the heating mechanism.

64. The system of any one of the examples herein, wherein the heating mechanism is configured to include a fluid having a temperature at or above the second temperature, and wherein the fluid does not directly contact the web.

65. The system of any one of the examples herein, wherein the heating mechanism is configured to receive steam having a temperature at or above the second temperature, and wherein the steam does not directly contact the web.

66 The system of any one of the examples herein, the apparatus further comprising a conductor thermally coupled to the heating mechanism and located between the heating mechanism and the web within the second zone, wherein the conductor directly contacts the web.

67. The system of any one of the examples herein, further comprising a conductor thermally coupled to the heating mechanism, and wherein the conductor is located between the heating mechanism and the web within the second zone, such that the conductor fluidically or spatially isolates the web from the heating mechanism.

68. The system of any one of the examples herein, further comprising a conductor thermally coupled to the heating mechanism, wherein the conductor comprises aluminum and/or a metal.

69. The system of any one of the examples herein, further comprising a first conductor and a second conductor downstream of the first conductor within the second zone, wherein the first conductor is at or greater than the second temperature, and wherein the second conductor is at a temperature lower than the second temperature and is configured to recapture heat from the web.

70. The system of any one of the examples herein, wherein the web includes a conductor configured to be heated via an electric current, and wherein the heating mechanism is operably coupled to the conductor such that the heating mechanism is configured to provide the electric current.

71. The system of any one of the examples herein, wherein the heating mechanism is not in direct contact with the web.

72. The system of any one of the examples herein, wherein the sorbent comprises a molecular weight less than 250 AMUs.

73. The system of any one of the examples herein, wherein the sorbent comprises at least one of an amino acid, lysine, glycine, taurine, alkali earth metal salt, or amine.

74. The system of any one of the examples herein, wherein the sorbent comprises at least one of lime, slaked lime, hydrated lime, calcium hydroxide, zeolites, mesoporous silicas, or metal-organic frameworks.

75. The system of any one of the examples herein, wherein the web has a length of at least 5 meters, and wherein no more than 25% of the length of the web is within the second zone at a point in time.

76. The system of any one of the examples herein, wherein the web is part of a closed loop and is recirculated via the drive mechanism between the first zone and the second zone.

77. The system of any one of the examples herein, wherein the second zone includes a first section, a second section downstream of the first section, and a third section downstream of the second section, wherein the heating mechanism is a first heating mechanism adjacent the first section and upstream of the second section, the system further comprising a second heating mechanism adjacent the second section and upstream of the third section, wherein the drive system is configured to transport the web from the first section to the second section and to the third section, and wherein the blower is positioned adjacent the third section and downstream of the second section.

78. The system of any one of the examples herein, wherein the blower is a first blower, the system further comprising a second blower configured to remove the fluid from the second zone.

79. The system of any one of the examples herein, wherein the web comprises cotton, cellulose, lignin, jute, flax, abaca, pina, ramie, bagasse, banana, wood, silk, wool, amphibole, wollasatone, palygorskite, nylon, rayon, Modal, diacetate, triacetate, carbon, polyester, PET, PBT, PF, PVC, PP, PE, PAN, Twaron, Kevlar, Nomex, HMPE, elastomers, urethane, Spandex, polyurethane, and/or elastolefin.

80 The system of any one of the examples herein, the apparatus further comprising a second conductor downstream of the heating mechanism that is at a temperature lower than the second temperature and is configured to recapture heat from the web.

81 The system of any one of the examples herein, the apparatus further comprising a collector configured to receive condensed fluid within the second zone, wherein the collector is at a temperature lower than the second temperature.

82 The system of any one of the examples herein, wherein the blower is a first blower and the second zone includes a first section and a second section downstream of the first section, wherein the system further comprises a second blower configured to direct air from the first section to the second section and toward the web in the second section.

83. An apparatus for removal of carbon dioxide gas, the apparatus comprising:
  a web comprising a sorbent configured to absorb carbon dioxide, wherein the sorbent comprises an amine group and/or a molecular weight of less than 1,000 atomic mass units (AMUs);
  a drive system operably coupled to the web, wherein, in operation:
    the drive system transports the web from a first zone, in which the web is exposed to gas, to a second zone, and
    the first zone is at a first temperature and the second zone is at a second temperature at least 5 degrees Celsius greater than the first temperature; and
  a heating mechanism configured to increase a temperature of the second zone at least to the second temperature.

84. The apparatus of example 83, wherein the heating mechanism is configured to hold a fluid having a temperature at or above the second temperature of at least 85 degrees Celsius, and wherein the fluid does not directly contact the web.

85. The apparatus of example 83, further comprising a conductor thermally coupled to the heating mechanism, and wherein the conductor is located between the heating mechanism and the web within the second zone, such that the conductor fluidically or spatially isolates the web from the heating mechanism.

86. The apparatus of example 83, further comprising a conductor thermally coupled to the heating mechanism and located between the heating mechanism and the web within the second zone, wherein the conductor directly contacts the web.

87. The apparatus of example 83, further comprising a first conductor and a second conductor downstream of the first conductor within the second zone, wherein the first conductor is at or greater than the second temperature, and wherein the second conductor is at a temperature lower than the second temperature and is configured to recapture heat from the web.

88. The apparatus of example 83, wherein the heating mechanism is configured to receive steam having a temperature at or above the second temperature, and wherein the steam does not directly contact the web.

89 The apparatus of example 83, wherein the second zone comprises a housing including a plurality of walls coupled to one another and that define a perimeter of the second zone.

90. The apparatus of example 89, wherein at least one of the plurality of walls includes a chemical component to inhibit reactions at a corresponding surface of the at least one of the plurality of walls.

91. The apparatus of example 83, wherein the heating mechanism comprises an electric resistive heater, an electric radiative heater, or a microwave heater.

92. The apparatus of example 83, wherein the heating mechanism is within the second zone, and wherein the drive system is configured to transport the web across the heating mechanism within the second zone.

93. A method for removing carbon dioxide gas, the method comprising:
providing a web comprising a sorbent configured to absorb carbon dioxide, wherein the sorbent comprises an amine group and/or a molecular weight of less than 1,000 atomic mass units (AMUs);
transporting the web via a drive mechanism from (i) a first zone to (ii) a second zone within an at least partially enclosed area;
heating a portion of the web within the second zone to a predetermined minimum temperature, such that (i) the first zone is at a first temperature and the second zone is at a second temperature at least 5 degrees Celsius greater than the first temperature, and (ii) an affinity of the web within the second zone to absorb carbon dioxide decreases; and
removing fluid comprising at least 0.1% carbon dioxide from the second zone.

94. The method of example 93, wherein heating the portion of the web within the second zone to the predetermined minimum temperature comprises transporting the web, via the drive mechanism, across a first plate that is in contact with a heating mechanism within the second zone.

95. The method of example 93, wherein heating the portion of the web within the second zone to the predetermined minimum temperature comprises directing steam having a temperature at or above the predetermined minimum temperature toward a conductor positioned between a heating mechanism and the web.

96. The method of example 93, further comprising transporting the web, via the drive mechanism, across a first conductor within the first zone and a second conductor within the second zone, wherein the second conductor is positioned downstream of the first conductor and causes the second conductor to recapture heat from the web.

97. The method of example 93, further comprising:
measuring a rate at which a collector receives condensed fluid within the second zone, wherein the collector is at a temperature lower than the predetermined minimum temperature; and
adjusting the temperature of the collector based on the rate.

98. The method of example 93, further comprising controlling a speed of the web via a speed control unit, and adjusting the speed of the web via the speed control unit based on a temperature of the web, a temperature of the second zone, and/or a carbon dioxide removal rate.

99 The method of example 93, further comprising creating a pressure differential between the first zone and the second zone.

100. The method of example 93, further comprising reducing an air pressure in the second zone to less than atmospheric pressure.

101. The method of example 93, wherein the web is part of a closed loop, further comprising recirculating the closed loop via the drive mechanism between the first zone and the second zone.

102. A system for removal of carbon dioxide gas, the system comprising:
an apparatus comprising:
a web comprising a sorbent configured to absorb carbon dioxide, wherein the sorbent comprises an amine group and/or a molecular weight of less than 1,000 atomic mass units (AMUs);
a drive system operably coupled to the web, wherein, in operation, the drive system transports the web from a first zone, configured to be at a first temperature, toward a second zone, configured to be operated at a second temperature greater than the first temperature; and
a heating mechanism configured to increase a temperature of the second zone at least to the second temperature; and
a controller operably coupled to the apparatus.

103. The system of example 102, wherein the apparatus further comprises a first pressure sensor configured to measure a first pressure within the first zone and a second pressure sensor configured to measure a second pressure within the second zone, and wherein the controller is configured to monitor the first pressure sensor and the second pressure sensor.

104. The system of example 102, wherein the apparatus further comprises a first temperature sensor configured to measure a first temperature within the first zone and a second temperature sensor configured to measure the second temperature within the second zone, and wherein the controller is configured to monitor the first temperature sensor and the second temperature sensor.

105. The system of example 102, the apparatus further comprising a blower positioned adjacent the second zone and configured to direct fluid away from the web in the second zone.

106. The system of example 102, further comprising (i) a first blower configured to direct fluid toward or away from the first zone, and (ii) a second blower configured to direct fluid away from the second zone.

107. The system of example 102, further comprising a blower configured to create a pressure differential between the first zone and the second zone, wherein the second zone is configured to operate at a pressure less than atmospheric pressure and a temperature greater than the first temperature.

108. The system of example 102, wherein the second zone comprises an enclosed unit configured to operate at a pressure less than atmospheric pressure and a temperature greater than the first temperature.

109. The system of example 102, wherein the apparatus further comprises a first pressure sensor configured to measure a first pressure within the first zone and a second pressure sensor configured to measure a second pressure within the second zone.

110. The system of example 109, wherein the controller is configured to monitor the first pressure sensor and the second pressure sensor.

111. The system of example 102, wherein the apparatus further comprises a first temperature sensor configured to measure a first temperature within the first zone and a second temperature sensor configured to measure the second temperature within the second zone.

112. The system of example 102, wherein the controller is configured to monitor the first temperature sensor and the second temperature sensor.

We claim:

1. An apparatus for removal of carbon dioxide gas, the apparatus comprising:
a web comprising a sorbent configured to absorb carbon dioxide, wherein the sorbent comprises an amine group and/or a molecular weight of less than 1,000 atomic mass units (AMUs);
a drive system operably coupled to the web, wherein, in operation:
the drive system transports the web from a first zone, in which the web is exposed to gas, to a second zone, and
the first zone is at a first temperature and the second zone is at a second temperature of at least 85 degrees Celsius and at least 5 degrees Celsius greater than the first temperature; and
a heating mechanism configured to increase a temperature of the second zone at least to the second temperature, wherein the heating mechanism is configured to hold a fluid having a temperature at or above the second temperature, and wherein the fluid does not directly contact the web.

2. The apparatus of claim 1, wherein the heating mechanism is configured to receive steam having a temperature at or above the second temperature, and wherein the steam does not directly contact the web.

3. The apparatus of claim 1, wherein the heating mechanism comprises an electric resistive heater, an electric radiative heater, or a microwave heater.

4. The apparatus of claim 1, wherein the heating mechanism is within the second zone, and wherein the drive system is configured to transport the web across the heating mechanism within the second zone.

5. An apparatus for removal of carbon dioxide gas, the apparatus comprising:
a web comprising a sorbent configured to absorb carbon dioxide, wherein the sorbent comprises an amine group and/or a molecular weight of less than 1,000 atomic mass units (AMUs);
a drive system operably coupled to the web, wherein, in operation:
the drive system transports the web from a first zone, in which the web is exposed to gas, to a second zone, and
the first zone is at a first temperature and the second zone is at a second temperature at least 5 degrees Celsius greater than the first temperature;
a heating mechanism configured to increase a temperature of the second zone at least to the second temperature; and
a conductor thermally coupled to the heating mechanism, wherein the conductor is located between the heating mechanism and the web within the second zone, such that the conductor fluidically or spatially isolates the web from the heating mechanism.

6. An apparatus for removal of carbon dioxide gas, the apparatus comprising:
a web comprising a sorbent configured to absorb carbon dioxide, wherein the sorbent comprises an amine group and/or a molecular weight of less than 1,000 atomic mass units (AMUs);
a drive system operably coupled to the web, wherein, in operation:
the drive system transports the web from a first zone, in which the web is exposed to gas, to a second zone, and
the first zone is at a first temperature and the second zone is at a second temperature at least 5 degrees Celsius greater than the first temperature;
a heating mechanism configured to increase a temperature of the second zone at least to the second temperature; and
a conductor thermally coupled to the heating mechanism and located between the heating mechanism and the web within the second zone, wherein the conductor directly contacts the web.

7. An apparatus for removal of carbon dioxide gas, the apparatus comprising:
a web comprising a sorbent configured to absorb carbon dioxide, wherein the sorbent comprises an amine group and/or a molecular weight of less than 1,000 atomic mass units (AMUs);
a drive system operably coupled to the web, wherein, in operation:
the drive system transports the web from a first zone, in which the web is exposed to gas, to a second zone, and
the first zone is at a first temperature and the second zone is at a second temperature at least 5 degrees Celsius greater than the first temperature;
a heating mechanism configured to increase a temperature of the second zone at least to the second temperature; and
a first conductor, and a second conductor downstream of the first conductor within the second zone, wherein the first conductor is at or greater than the second temperature, and wherein the second conductor is at a temperature lower than the second temperature and is configured to recapture heat from the web.

8. An apparatus for removal of carbon dioxide gas, the apparatus comprising:
a web comprising a sorbent configured to absorb carbon dioxide, wherein the sorbent comprises an amine group and/or a molecular weight of less than 1,000 atomic mass units (AMUs);
a drive system operably coupled to the web, wherein, in operation:
the drive system transports the web from a first zone, in which the web is exposed to gas, to a second zone, and
the first zone is at a first temperature and the second zone is at a second temperature at least 5 degrees Celsius greater than the first temperature;

a heating mechanism configured to increase a temperature of the second zone at least to the second temperature, wherein the second zone comprises a housing including a plurality of walls coupled to one another and that define a perimeter of the second zone, and wherein at least one of the plurality of walls includes a chemical component to inhibit reactions at a corresponding surface of the at least one of the plurality of walls.

9. A method for removing carbon dioxide gas, the method comprising:
providing a web comprising a sorbent configured to absorb carbon dioxide, wherein the sorbent comprises an amine group and/or a molecular weight of less than 1,000 atomic mass units (AMUs);
transporting the web via a drive mechanism from (i) a first zone to (ii) a second zone within an at least partially enclosed area;
heating, using a heating mechanism, a portion of the web within the second zone to a predetermined minimum temperature, such that (i) the first zone is at a first temperature and the second zone is at a second temperature of at least 85 degrees Celsius and at least 5 degrees Celsius greater than the first temperature, and (ii) an affinity of the web within the second zone to absorb carbon dioxide decreases, wherein the heating mechanism is configured to hold a fluid having a temperature at or above the second temperature, and wherein the fluid does not directly contact the web; and
removing fluid comprising at least 0.1% carbon dioxide from the second zone.

10. The method of claim 9, wherein heating the portion of the web within the second zone to the predetermined minimum temperature comprises transporting the web, via the drive mechanism, across a first plate that is in contact with the heating mechanism within the second zone.

11. The method of claim 9, wherein heating the portion of the web within the second zone to the predetermined minimum temperature comprises directing steam having a temperature at or above the predetermined minimum temperature toward a conductor positioned between the heating mechanism and the web.

12. The method of claim 9, further comprising transporting the web, via the drive mechanism, across a first conductor within the first zone and a second conductor within the second zone, wherein the second conductor is positioned downstream of the first conductor and causes the second conductor to recapture heat from the web.

13. The method of claim 9, further comprising:
measuring a rate at which a collector receives condensed fluid within the second zone, wherein the collector is at a temperature lower than the predetermined minimum temperature; and
adjusting the temperature of the collector based on the rate.

14. The method of claim 9, further comprising controlling a speed of the web via a speed control unit, and adjusting the speed of the web via the speed control unit based on a temperature of the web, a temperature of the second zone, and/or a carbon dioxide removal rate.

15. The method of claim 9, further comprising creating a pressure differential between the first zone and the second zone.

16. The method of claim 9, further comprising reducing an air pressure in the second zone to less than atmospheric pressure.

17. The method of claim 9, wherein the web is part of a closed loop, further comprising recirculating the closed loop via the drive mechanism between the first zone and the second zone.

18. A system for removal of carbon dioxide gas, the system comprising:
an apparatus comprising:
a web comprising a sorbent configured to absorb carbon dioxide, wherein the sorbent comprises an amine group and/or a molecular weight of less than 1,000 atomic mass units (AMUs);
a drive system operably coupled to the web, wherein, in operation, the drive system transports the web from a first zone, configured to be at a first temperature, toward a second zone, configured to be operated at a second temperature greater than the first temperature, wherein the second temperature is at least 85 degrees Celsius; and
a heating mechanism configured to increase a temperature of the second zone at least to the second temperature, wherein the heating mechanism is configured to hold a fluid having a temperature at or above the second temperature, and wherein the fluid does not directly contact the web; and
a controller operably coupled to the apparatus.

* * * * *